(12) United States Patent
Hao et al.

(10) Patent No.: US 8,628,855 B2
(45) Date of Patent: Jan. 14, 2014

(54) HARDCOATS COMPRISING PERFLUOROPOLYETHER POLYMERS WITH POLY(ALKYLENE OXIDE) REPEAT UNITS

(75) Inventors: Encai Hao, Woodbury, MN (US); Zai-Ming Qiu, Woodbury, MN (US); Yu Yang, Eden Prairie, MN (US); Thomas P. Klun, Lakeland, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 632 days.

(21) Appl. No.: 12/740,357

(22) PCT Filed: Dec. 10, 2008

(86) PCT No.: PCT/US2008/086138
§ 371 (c)(1),
(2), (4) Date: Apr. 29, 2010

(87) PCT Pub. No.: WO2009/076389
PCT Pub. Date: Jun. 18, 2009

(65) Prior Publication Data
US 2010/0310875 A1  Dec. 9, 2010

Related U.S. Application Data

(60) Provisional application No. 61/013,128, filed on Dec. 12, 2007.

(51) Int. Cl.
*B32B 27/30* (2006.01)
(52) U.S. Cl.
USPC ........... 428/421; 525/193; 526/246; 526/312; 526/322; 526/325; 526/329.4
(58) Field of Classification Search
USPC ............... 526/246, 312, 322, 325, 329.4; 560/157, 166; 525/193
See application file for complete search history.

(56) References Cited

U.S. PATENT DOCUMENTS

| | | | |
|---|---|---|---|
| 3,944,527 A * | 3/1976 | McCown | 526/243 |
| 4,825,249 A | 4/1989 | Oki et al. | |
| 5,822,489 A | 10/1998 | Hale | |
| 5,858,519 A | 1/1999 | Klinger et al. | |
| 5,965,659 A | 10/1999 | Kubo et al. | |
| 6,376,572 B1 | 4/2002 | Turri | |
| 6,833,393 B2 | 12/2004 | Ishizeki et al. | |
| 6,893,731 B2 | 5/2005 | Kausch | |
| 6,906,115 B2 | 6/2005 | Hanazawa et al. | |
| 7,026,030 B2 | 4/2006 | Itoh et al. | |
| 7,090,909 B2 | 8/2006 | Itoh et al. | |
| 7,101,618 B2 | 9/2006 | Coggio et al. | |
| 7,119,959 B2 | 10/2006 | Shoshi et al. | |
| 7,332,217 B2 * | 2/2008 | Coggio et al. | 428/336 |
| 7,671,153 B2 * | 3/2010 | Paiva et al. | 526/246 |
| 7,718,264 B2 | 5/2010 | Klun et al. | |
| 8,168,690 B2 * | 5/2012 | Oguni et al. | 522/96 |
| 2003/0168783 A1 | 9/2003 | Dams | |
| 2004/0181008 A1 | 9/2004 | Hanazawa et al. | |
| 2005/0158504 A1 | 7/2005 | Itoh et al. | |
| 2005/0182199 A1 | 8/2005 | Jing et al. | |
| 2005/0249940 A1 | 11/2005 | Klun et al. | |
| 2005/0288385 A1 | 12/2005 | Kondo et al. | |
| 2006/0216500 A1 | 9/2006 | Klun et al. | |
| 2007/0129492 A1 | 6/2007 | Colborn et al. | |
| 2007/0286993 A1 | 12/2007 | Radcliffe et al. | |
| 2009/0025727 A1 | 1/2009 | Klun et al. | |
| 2010/0055470 A1 | 3/2010 | Klun et al. | |
| 2012/0142883 A1 * | 6/2012 | Klun et al. | 528/69 |

FOREIGN PATENT DOCUMENTS

| | | |
|---|---|---|
| EP | 0 457 610 | 11/1991 |
| EP | 0 537 360 | 4/1993 |
| EP | 0 743 349 | 3/2003 |
| EP | 1 411 073 | 4/2004 |
| WO | 2005/111157 | 11/2005 |
| WO | 2005/113641 | 12/2005 |
| WO | 2006/007507 | 1/2006 |
| WO | 2006/073920 | 7/2006 |
| WO | 2009/029438 | 3/2009 |

OTHER PUBLICATIONS

International Search Report PCT/US2008/086138 Mar. 13, 2009; 3 pages.

* cited by examiner

*Primary Examiner* — Nicole M Buie-Hatcher
(74) *Attorney, Agent, or Firm* — Carolyn A. Fischer

(57) ABSTRACT

Presently described are articles, such as optical displays and protective films, comprising a (e.g. light transmissive) substrate having a surface layer comprising the reaction product of a mixture comprising a non-fluorinated binder precursor (e.g. of a hardcoat composition) and at least one polymerizable perfluoropolyether polymer. The resulting cured surface layer can advantageously exhibit low lint attraction in combination with low surface energy. Also described are one-step and two-step methods of synthesizing perfluoropolyether polymers having polymerizable ethylenically unsaturated groups.

10 Claims, No Drawings

US 8,628,855 B2

HARDCOATS COMPRISING PERFLUOROPOLYETHER POLYMERS WITH POLY(ALKYLENE OXIDE) REPEAT UNITS

CROSS REFERENCE TO RELATED APPLICATIONS

This application is a national stage filing under 35 U.S.C. 371 of PCT/US2008/086138, filed Dec. 10, 2008, which claims priority to U.S. Provisional Application No. 61/013,128, filed Dec. 12, 2007, the disclosure of which is incorporated by reference in its entirety herein.

BACKGROUND OF THE INVENTION

Hardcoats have been used to protect the face of optical displays. Hardcoats typically contain inorganic oxide particles, e.g., silica, of nanometer dimensions dispersed in a binder precursor resin matrix, and sometimes are referred to as "ceramers".

Fluorinated materials have been incorporated into hardcoats to reduce the surface energy rendering the surface ink repellent and/or easy to clean.

SUMMARY

The Applicant has found that the inclusion of a fluorinated additive in a hardcoat composition advantageously reduces the surface energy rendering the surface ink repellent and/or easy to clean. However, the inclusion of such additive can disadvantageously result in an increased attraction to lint.

In one embodiment, an (e.g. optical display or protective) article is described comprising an (e.g. optical) substrate having a surface layer that exhibits a cellulose surface attraction of no greater than 10%. The surface layer comprises the reaction product of A) at least one perfluoropolyether polymer comprising the reaction product of: i) at least one perfluoropolyether monomer comprising at least one ethylenically unsaturated group; ii) at least one poly(alkylene oxide) monomer comprising at least one ethylenically unsaturated group; and iii) optionally at least one ethylenically unsaturated monomer that lacks a perfluoropolyether group and an alkylene oxide repeat unit; and B) at least 50 wt-% of a non-fluorinated binder precursor.

In another embodiment, a polymerizable perfluoropolyether polymer is described that can be represented by the general formula:

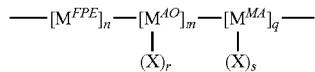

wherein
$M^{FPE}$ represents repeat units derived from one or more monoethylenically unsaturated monomers having a perfluoropolyether group and a Mw of at least 600 g/mole;
$M^{AO}$ represents repeat units derived from one or more ethylenically unsaturated monomers having an alkylene oxide repeat units;
$M^{MA}$ represents units derived from ethylenically unsaturated monomers that lack a perfluoropolyether group and an alkylene oxide repeat unit;
each X independently comprises an ethylenically unsaturated group;
n and m each independently represent a value of 1 to 100 wherein the sum of n+m is at least 3;
q represents a value of 0 to 100; and
r and s each independently represent a value of 0 to 6 with the proviso that the sum of r+s is at least 1.

The resulting cured surface layer can advantageously exhibit low lint attraction in combination with low surface energy.

Also described are one-step and two-step methods of synthesizing perfluoropolyether polymers having polymerizable ethylenically unsaturated groups.

DETAILED DESCRIPTION OF PREFERRED EMBODIMENTS

As used herein "ethylenically unsaturated group" refers to a polymerizable carbon-carbon double bond. The perfluoropolyether polymer typically comprises pendant ethylenically unsaturated groups for improved durability.

A preferred ethylenically unsaturated group of the perfluoropolyether polymer and the monomers employed in the synthesis of the perfluoropolyether polymer is a "free-radically polymerizable group" that participates in crosslinking reactions upon exposure to a suitable source of free radicals. Free-radically polymerizable groups include for example (meth)acryl groups, —SH, allyl, or vinyl and combinations thereof.

A preferred free-radically polymerizable group is "(meth) acryl" which includes (meth)acrylamides, and (meth)acrylates optionally substituted with for example fluorine and sulfur such as in the case of —C(O)CF=$CH_2$.

Preferred (meth)acryl groups include methacrylate and acrylate. Multi-(meth)acrylate materials comprise at least two polymerizable (meth)acrylate groups; whereas mono-(meth)acrylate material has a single (meth)acrylate group.

The invention will be described herein with respect to monomers comprising at least one (meth)acrylate group. However, it is appreciated that other (meth)acryl, free-radically polymerizable, and ethylenically unsaturated functional groups could be employed in place of the described (meth) acrylate groups.

Presently described are various (e.g. optical display and protective film) articles comprising a substrate having a surface layer comprising the reaction product of a (e.g. ultraviolet radiation curable) mixture comprising A) at least one perfluoropolyether polymer having a perfluoroalkoxy repeat unit and a poly(alkylene oxide) repeat unit, and preferably at least one free-radically polymerizable group. The perfluoropolyether polymer is dispersed in B) at least 50 wt-% of a non-fluorinated binder precursor (e.g. of a hardcoat composition).

The perfluoropolyether polymer comprises the reaction product of a polymerizable composition comprising i) at least one perfluoropolyether monomer comprising at least one ethylenically unsaturated group; ii) at least one poly(alkylene oxide) monomer comprising at least one ethylenically unsaturated group; and iii) optionally at least one other ethylenically unsaturated monomer. As used herein "other" refers to a monomer lacking a perfluoropolyether group and lacking a poly(alkylene oxide) group.

The perfluoropolyether polymer alone or optionally in combination with other fluorinated (e.g. perfluoropolyether) additive contributes low surface energy. The surface energy can be characterized by various methods such as contact angle and ink repellency. Preferably, the surface layer exhibits a static contact angle with water of at least 80 degrees. More preferably, the contact angle is at least about 90 degrees. Most preferably, the contact angle is at least about 100 degrees. Alternatively, or in addition thereto, the receding contact angle with hexadecane is at least 50 degrees. More preferably, the receding contact angle with hexadecane is at least 60 degrees. Low surface energy results in anti-soiling and stain repellent properties as well as rendering the exposed surface easy to clean.

Another indicator of low surface energy relates to the extent to which ink from a pen or marker beads up when applied to the exposed surface. The surface layer and articles exhibit "ink repellency" when ink from pens and markers beads up into discrete droplets and can be easily removed by wiping the exposed surface with tissues or paper towels, such as tissues available from the Kimberly Clark Corporation, Roswell, Ga. under the trade designation "SURPASS FACIAL TISSUE."

Although perfluoropolyether polymers lacking ethylenically unsaturated groups reduces the attraction of lint to the surface layer, this approach is less durable than employing a perfluoropolyether polymer that comprises ethylenically unsaturated groups that are copolymerized with the polymerizable binder precursor of the hardcoat composition.

A durable hardcoat retains its low surface energy properties such as ink repellency. Durability can be defined in terms of retained surface properties after being wiped with steel wool (according to the test method described in the examples). Durable hardcoat exhibit a loss of ink repellency of no greater than 50% loss, preferably no greater than 25% loss, more preferably no greater than 10% loss, and most preferably substantially no loss.

In addition to the low surface energy, the surface layers described herein exhibit a low attraction to lint, contributed from the presence of poly(alkylene oxide). The surface layers described herein preferably have a haze of less than 20%, more preferably less than 10% and even more preferably less than 5% according to the Cellulose Surface Attraction Test, (such test described in further detail in the examples).

Also described herein are certain polymerizable perfluoropolyether polymers and methods of synthesis.

The perfluoropolyether polymer can be represented by the general formula:

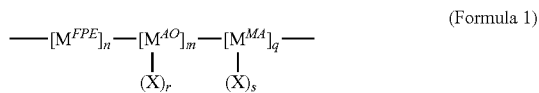

(Formula 1)

wherein
$M^{FPE}$ represents repeat units derived from one or more monoethylenically unsaturated monomers having a perfluoropolyether group and a Mw of at least 600 g/mole;
$M^{AO}$ represents repeat units derived from one or more ethylenically unsaturated monomers having an alkylene oxide repeat units;
$M^{MA}$ represents units derived from ethylenically unsaturated monomers that lack a perfluoropolyether group and an alkylene oxide repeat unit;
each X independently comprises an ethylenically unsaturated group;
n and m each independently represent a value of 1 to 100 wherein the sum of n+m is at least 3;
q represents a value of 0 to 100; and
r and s each independently represent a value of 0 to 6 wherein the sum of r+s is at least one.

In some embodiments, n is at least 1, 2, 3, 4, 5, 6, 7, 8, 9 or 10 and typically no greater 50; and m is at least 2, 5, 10, 20, 40 or 100 and typically no greater than 400. Further, the ratio of the number of $M^{FPE}$ repeat units to the number of $M^{AO}$ repeat units can range from about 1:1 to about 1:30. In one embodiment, n ranges from 1 to 10 and m ranges from 4 to 50.

Although not depicted in Formula 1, the perfluoropolyether polymer further comprises the residue of a least one initiator and a terminal group as is known in the art. In some embodiments, the perfluoropolyether polymer further comprises the residue of a chain transfer agent as will subsequently be described.

In some embodiments, the perfluoropolyether polymer is prepared by polymerizing one or more mono-ethylenically unsaturated monomers having a perfluoropolyether group, $M^{FPE}$, with one or more ethylenically unsaturated monomers having an alkylene oxide repeat units, $M^{AO}$, (i.e. without $M^{MA}$). In this embodiment, r (i.e. the number of ethylenically unsaturated (meth)acrylate groups) is at least one and in some embodiments at least two or three.

In other embodiments, at least one other monomer $M^{MA}$ is included in the polymerization. In this embodiment, s is at least one and r may by zero. Alternatively r and s may each be at least one.

The total amount of perfluoropolyether monomeric repeat units to the total monomeric units is typically at least 5, 10, 20, 30, 40 or 50 wt-%. Insufficient amounts of perfluoropolyether monomeric repeat units result in the polymer or hardcoat having poor ink repellency. Too much perfluoropolyether monomeric repeat units can reduce the solubility of the polymer in organic solvent and reduce its compatibility with the non-fluorinated binder precursor.

The total amount of poly(alkylene oxide) monomeric repeat units to the total monomeric units is typically at least 10, 20, 30, 40, 50, 60 or 70 w. Insufficient amounts of poly (alkylene oxide) monomeric repeat units results in high attraction to lint (e.g. higher haze values).

For embodiments, wherein other (meth)acrylate monomers are included in the polymerization of the perfluoropolyether polymer, the total amount of other (meth)acrylate monomeric units to the total amount of monomer units can be 5, 10, 20, 30, or 40 w. $M^{MA}$ can be any of the multi-ethylenically unsaturated (e.g. (meth)acrylate) binder precursors of the hardcoat. The presence of the other (meth)acrylate monomers, $M^{MA}$, can increase the compatibility of the perfluoropolyether with other polymerizable monomers such as the binder precursor of the hardcoat composition. In some embodiments, $M^{MA}$ is a monofunctional ethylenically unsaturated (e.g. (meth)acrylate) monomer such as $CH_2=CMeCO_2CH_2CH_2OH$, $CH_2=CHCO_2CH_2CH_2OH$, $CH_2=CHCO_2(CH_2)_4OH$, $CH_2=CMeCO_2(CH_2)_4OH$, $HOCH_2C(OC(O)CH=CH_2)_2—CH_2OC(O)CH=CH_2$, $CH_2=CHC(O)Cl$, $CH_2=CMeC(O)Cl$ and $CH_2=CMeCO_2CH_2CH_2NCO$.

Various perfluoropolyether monomers having ethylenic unsaturations are suitable for use in the polymerization of the perfluoropolyether polymers. Preferred $M^{FPE}$ perfluoropolyether monomers can be represented by the following Formula (2):

(Formula 2)

wherein $R_f$ is a (per)fluoropolyether group; $L_1$ is a linking group; and $X_f$ is a free-radically polymerizable group such as (meth)acryl, —SH, allyl, or vinyl, and is preferably a (meth) acrylate or —C(O)CF=CH_2 group; d ranges from 1 to 6; and e is 1 or 2.

The perfluoropolyether group $R_f$ can be linear, branched, cyclic, or combinations thereof and can be saturated or unsaturated. The perfluoropolyether has at least four catenated oxygen heteroatoms. Exemplary perfluoropolyethers include, but are not limited to, those that have perfluorinated repeating units selected from the group of $(C_pF_{2p})-$, $-(C_pF_{2p}O)-$, $-(CF(Z))-$, $-(CF(Z)O)-$, $-(CF(Z)C_pF_{2p}O)-$, $-(C_pF_{2p}CF(Z)O)-$, $-(CF_2CF(Z)O)-$, or combinations thereof. In these repeating units, p is typically an integer of 1 to 10. In some embodiments, p is an integer of 1 to 8, 1 to 6, 1 to 4, or 1 to 3. The group Z is a perfluoroalkyl group, perfluoroether group, perfluoropolyether, or a perfluoroalkoxy group, all of which can be linear, branched, or cyclic. The Z group typically has no more than 12 carbon atoms, no more than 10 carbon atoms, or no more than 9 carbon atoms, no more than 4 carbon atoms, no more than 3 carbon atoms, no more than 2 carbon atoms, or no more than 1 carbon atom. In some embodiments, the Z group can have no more than 4, no more than 3, no more than 2, no more than 1, or no oxygen atoms. In these perfluoropolyether structures, the different repeat units can be distributed randomly along the chain.

$R_f$ can be monovalent or divalent. In some compounds where $R_f$ is monovalent, the terminal groups can be $(C_pF_{2p+1})-$, $(C_pF_{2p+1}O)-$, $(X'C_pF_{2p}O)-$, or $(X'C_pF_{2p})-$ where X' is hydrogen, chlorine, or bromine and p is an integer of 1 to 10. In some embodiments of monovalent $R_f$ groups, the terminal group is perfluorinated and p is an integer of 1 to 10, 1 to 8, 1 to 6, 1 to 4, or 1 to 3. Exemplary monovalent $R_f$ groups include $CF_3O(C_2F_4O)_aCF_2-$, $C_3F_7O(CF_2CF_2CF_2O)_aCF_2CF_2-$, and $C_3F_7O(CF(CF_3)CF_2O)_aCF(CF_3)-$ wherein "a" has an average value of 0 to 50, 1 to 50, 3 to 30, 3 to 15, or 3 to 10.

Suitable structures for divalent $R_f$ groups include, but are not limited to, $-CF_2O(CF_2O)_b(C_2F_4O)_aCF_2-$, $-CF_2CF_2O(C_3F_6O)_aCF_2CF_2-$, $-(CF_2)_3O(C_4F_8O)_a(CF_2)_3-$, $-CF_2O(C_2F_4O)_aCF_2-$, and $-CF(CF_3)(OCF_2CF(CF_3))_bOC_xF_{2t}O(CF(CF_3)CF_2O)_aCF(CF_3)-$, wherein a and b independently average value of 0 to 50, 1 to 50, 3 to 30, 3 to 15, or 3 to 10; the sum (a+b) has an average value of 0 to 50 or 4 to 40; and t is an integer of 2 to 6.

As synthesized, compounds according to Formula (1) typically include a mixture of $R_f$ groups. The average structure is the structure averaged over the mixture components. The values of q, n, and s in these average structures can vary, as long as the compound has a number average molecular weight of at least about 600. Compounds of Formula (1) preferably have a molecular weight (number average) of 700, 800, 900, 1,000, 1100, 1200, 1300, 1400, 1500, 1600, 1700, 1800, 1900, or 2000 and no greater than about, 5,000, 4,000, or 3,000.

The linking group $L_1$ between the perfluoropolyether segment and ethylenically unsaturated endgroup includes a divalent or higher valency group selected from an alkylene, arylene, heteroalkylene, or combinations thereof and an optional divalent group selected from carbonyl, ester, amide, sulfonamide, or combinations thereof. $L_1$ can be unsubstituted or substituted with an alkyl, aryl, halo, or combinations thereof. The $L_1$ group typically has no more than 30 carbon atoms. In some compounds, the $L_1$ group has no more than 20 carbon atoms, no more than 10 carbon atoms, no more than 6 carbon atoms, or no more than 4 carbon atoms. For example, $L_1$ can be an alkylene, an alkylene substituted with an aryl group, or an alkylene in combination with an arylene or an alkyl ether or alkyl thioether linking group.

Perfluoropolyether acrylate compounds can be synthesized by known techniques such as described in U.S. Pat. Nos. 3,553,179 and 3,544,537 as well as U.S. Patent Application Publication No. 2004/0077775.

The fluoropolyether (meth)acrylate compound may be produced by introducing (meth)acryl group at the hydroxyl group of fluoropolyether compound having a terminal hydroxyl group. Suitable examples of such hydroxyl-group containing fluoropolyether compounds includes for example:
$HOCH_2-CF_2O-[CF_2CF_2O]_1-[CF_2O]_m-CF_2CH_2OH$,
$F-[CF_2CF_2CF_2O]_1-CF_2CF_2CH_2OH$,
$F-[CF(CF_3)CF_2O]_1-CF(CF_3)CH_2OH$,
$HO(CH_2CH_2O)_n-CH_2CF_2O[CF_2CF_2O]_1-[CF_2O]-CF_2CH_2(OCH_2CH_2)_nOH$, and
$HOCH_2CH(OH)CH_2O-CH_2-CF_2O-[CF_2CF-_2O]_1-[CF_2O]_m-CF_2CH_2OCH_2CH(OH)CH_2OH$.

In some embodiments, the perfluoropolyether group comprises an "HFPO-" end group, i.e. the end group $F(CF(CF_3)CF_2O)_aCF(CF_3)-$ (of the methyl ester $F(CF(CF_3)CF_2O)_aCF(CF_3)C(O)OCH_3$) wherein "a" averages 2 to 15. In some embodiments, "a" averages at least 3 or 4. Typically, "a" is no greater than 10 or 8. Such compound generally exist as a distribution or mixture of oligomers with a range of values for a, so that the average value of a may be non-integer. In one embodiment, a averages about 6.

One suitable perfluoropolyether diacrylate oligomer reported by the supplier to have a refractive index of 1.341 is commercially available from Sartomer under the trade designation "CN4000". In view of the low refractive index, this material is believed to have a fluorine content of at least about 50 wt-%. Based on NMR analysis, CN4000 has a molecular weight (Mn) of about 1300 g/mole.

Although the polymerization method is not particularly limited, the perfluoropolyether polymer is typically prepared via solution polymerization in a (e.g. non-fluorinated) dilute solution with organic solvent.

A single organic solvent or a blend of solvents can be employed in the preparation of the perfluoropolyether polymer. Depending on the free-radically polymerizable materials employed, suitable solvents include alcohols such as isopropyl alcohol (IPA) or ethanol; ketones such as methyl ethyl ketone (MEK), methyl isobutyl ketone (MIBK), diisobutyl ketone (DIBK); cyclohexanone, or acetone; aromatic hydrocarbons such as toluene; isophorone; butyrolactone; N-methylpyrrolidone; tetrahydrofuran; esters such as lactates, acetates, including propylene glycol monomethyl ether acetate such as commercially available from 3M under the trade designation "3M Scotchcal Thinner CGS10" ("CGS10"), 2-butoxyethyl acetate such as commercially available from 3M under the trade designation "3M Scotchcal Thinner CGS50" ("CGS50"), diethylene glycol ethyl ether acetate (DE acetate), ethylene glycol butyl ether acetate (EB acetate), dipropylene glycol monomethyl ether acetate (DPMA), iso-alkyl esters such as isohexyl acetate, isoheptyl acetate, isooctyl acetate, isononyl acetate, isodecyl acetate, isododecyl acetate, isotridecyl acetate or other iso-alkyl esters; combinations of these and the like. However, solvents with —OH groups are generally avoided when urethane linkages are formed during the two-step process, as will subsequently be described.

At least one free-radical initiator is typically utilized for the preparation of the perfluoropolyether polymer. Useful free-radical thermal initiators include, for example, azo, peroxide, persulfate, and redox initiators, and combinations thereof. Useful free-radical photoinitiators include, for example, those known as useful in the UV cure of acrylate polymers. In some aspects, polymer is solution polymerized by use of a thermal initiator and then photopolymerized after being combined with the binder precursor. In addition, other additives may be added to the final composition. These include but are not limited to resinous flow aids, photostabilizers, high boiling point solvents, and other compatibilizers well known to those of skill in the art.

In one embodiment, the i) at least one perfluoropolyether monomer comprising at least one ethylenically unsaturated (e.g. (meth)acrylate) group; ii) at least one poly(alkylene oxide) monomer comprising at least one ethylenically unsaturated (e.g. (meth)acrylate) group; and iii) optionally at least one other monomer comprising at least one ethylenically unsaturated are concurrently polymerized in a one-step process. At least one of the starting monomers (i.e. ii) and/or iii) comprises at least two polymerizable ethylenically unsaturated (e.g. (meth)acrylate) groups. By inclusion of at least one multifunctional monomer and controlled reaction conditions, the perfluoropolyether polymer thus formed typically comprises unreacted (meth)acrylate ethylenically unsaturated group that can be crosslinked such as by exposure to ultraviolet energy after being combined with a binder precursor.

In some aspects, a perfluoropolyether mono-(meth)acrylate monomer is copolymerized with poly(alkylene oxide) multi-(meth)acrylate monomer. In other aspects, a perfluoropolyether multi-(meth)acrylate monomer is copolymerized with poly(alkylene oxide) mono-(meth)acrylate monomer. In yet other aspects, a perfluoropolyether multi-(meth)acrylate monomer is copolymerized with a poly(alkylene oxide) multi-(meth)acrylate monomer. A perfluoropolyether polymer can also be formed by reacting a perfluoropolyether mono-(meth)acrylate monomer, a poly(alkylene oxide) mono-(meth)acrylate monomer, and at least one other multi-(meth)acrylate monomer.

The reaction product is surmised to comprise a mixture of unreacted monomeric starting material, oligomeric species, and perfluoropolyether polymeric species having a hyperbranched structure. A hyperbranched polymer is defined as any polymer in which the structural repeat unit has a connectivity of more than two; this definition may be extended to hypercrosslinked polymers (in which macrocycles are present, but not to ladder and spiro polymers). The described hyperbranched polymers are surmised to have a high molecular weight while remaining soluble or dispersible.

The perfluoropolyether polymer formed can be dissolved or dispersed in a compatible (e.g. non-fluorinated) organic solvent. The perfluoropolyether polymer is typically present at concentration of at least 5 wt-% solids. In some embodiments, the concentration is at least about 10 wt-%. At concentrations of about 15 wt-%, the composition may gel. It is typically preferred that the concentration of polymer approaches, yet is less than, the concentration that causes a gel transition in order to maximize molecular weight of the perfluoropolyether polymer.

For the one-step method, the poly(alkylene oxide) ethylenically unsaturated (e.g. (meth)acrylate) monomer, $M^{AO}$, can be represented by the general formula:

$$R^1L_4(C_iH_{2i}O)_jL_2X_k \quad \text{(Formula 3)}$$

wherein
$R^1$ is H or a lower alkyl group having 1 to 18 carbon atoms or X;
i ranges from 2 to 4;
j ranges from 4 to 250;
X comprises an ethylenically unsaturated group such as (meth)acrylate;
k ranges from 1 to 4, with 1 or 2 being preferred;
$L_2$ represents a covalent bond or $L_1$ (i.e. a divalent or higher valency linking group as previously described); and
$L_4$ represents a heteroatom or $L_2$.

In some embodiments, i is preferably 2 or 3, or a mixture of at least one poly(ethylene oxide) ethylenically unsaturated monomer and at least one poly(propylene oxide) ethylenically unsaturated monomer. The poly(alkylene oxide) monomer typically has a molecular weight of at least 200 g/mole, 250 g/mole, or 300 g/mole. Further, the molecular weight is typically no greater than about 5000 g/mole, and preferably less than about 3000 g/mole.

Alternatively, the perfluoropolyether polymer can be prepared in a two-step process that comprises forming a perfluoropolyether (e.g. (meth)acrylate) polymeric intermediate by free-radically polymerizing:

i) at least one perfluoropolyether monomer comprising at least one ethylenically unsaturated (e.g. (meth)acrylate) group;

ii) at least one poly(alkylene oxide) monomer comprising at least one ethylenically unsaturated (e.g. (meth)acrylate) group; and iii) optionally at least one other monomer comprising at least one ethylenically unsaturated.

In the two-step method at least one of i), ii) or iii) further comprises a reactive group, $-R^A$, that is free of ethylenic unsaturation and thus is not subject to free radical polymerization, yet can be subsequently reacted to introduce ethylenic unsaturations.

For the two-step process, the poly(alkylene oxide) ethylenically unsaturated (e.g. (meth)acrylate) monomer, $M^{AO}$, can be represented by Formula 3, as previously described. For other embodiments, $R^1$ can alternatively comprise a reactive group, $R^A$. $R^A$ is typically $-OH$ or $-NR'H$, where $R^1$ is H or lower alkyl of 1 to 4 carbon atoms.

This first step of the reaction may produce a random copolymer comprising perfluoropolyether units bonded to poly(alkylene oxide) by means of polymerized ethylenically unsaturated (e.g. (meth)acrylate) linkages. Alternatively, other reaction sequences could be employed to produce a block copolymer from such monomers. The random or block copolymer further comprises one or more non-free-radically polymerizable reactive $-R^A$ group(s). Depending on the selection of starting monomers, the first step of the reaction can be represented by any one of Formulas 4A-4C as follows:

(Formula 4A)

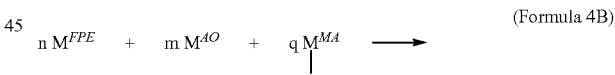

(Formula 4B)

(Formula 4C)

After the perfluoropolyether (e.g. (meth)acrylate) polymeric intermediate is formed, at least a portion and preferably substantially all the unreacted $-R^A$ group(s) are reacted with iv) a monomer $R^B-X$, that comprises an $R^B-$ group that reacts with the $-R^A$ group(s) and at least one ethylenically unsaturated (e.g. (meth)acrylate) group, $-X$. Since this second step of the reaction involves a non-free radical reaction mechanism, the ethylenically unsaturated (e.g. (meth)acrylate) group(s) of monomer iv) are introduced into the perfluoropolyether (meth)acrylate) polymer backbone via the reaction of $R^B$— with —$R^A$. Depending on the selection of starting monomers, the second step of the reaction can be represented by any one of Formulas 5A-5C as follows:

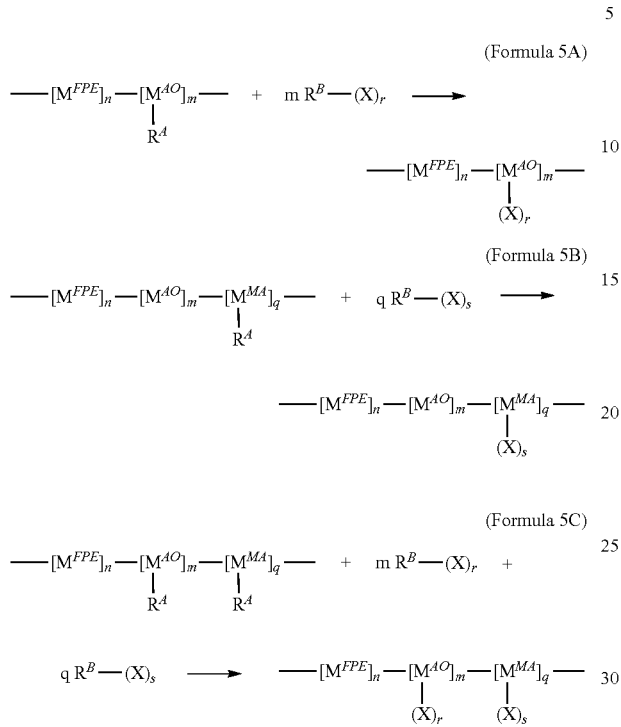

In some preferred embodiments, the polymerizable (meth) acrylate group is reacted onto the perfluoropolyether (meth) acrylate) polymer backbone via the formation of a urethane linkage. Thus, the reactive group —$R^A$ comprises an isocyanate (i.e. —NCO) group and $R^B$— comprises an isocyanate-reactive group such as a hydroxyl, or amine group, or vice-versa.

In one preferred embodiment, the perfluoropolyether (meth)acrylate monomer is first polymerized with poly(alkylene oxide) (meth)acrylate monomer comprising a reactive hydroxy group. The obtained perfluoropolyether polymer with hydroxy groups is further reacted with $R^B$—(X)$_r$, such as OCNC$_2$H$_4$OC(O)CMe=CH$_2$, by an addition reaction via a urethane linkage. An exemplary reaction sequence wherein PEO is polyethylene oxide comprising at least four repeat units and HFPO- comprises a perfluoropolyether moiety having the formula F(CF(CF$_3$)CF$_2$O)$_a$CF(CF$_3$)— and "a" ranges from 4 to 15 is shown as follows:

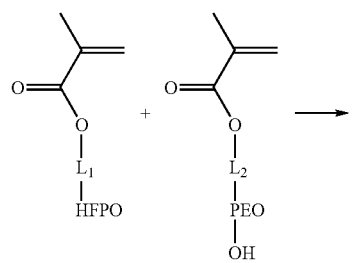

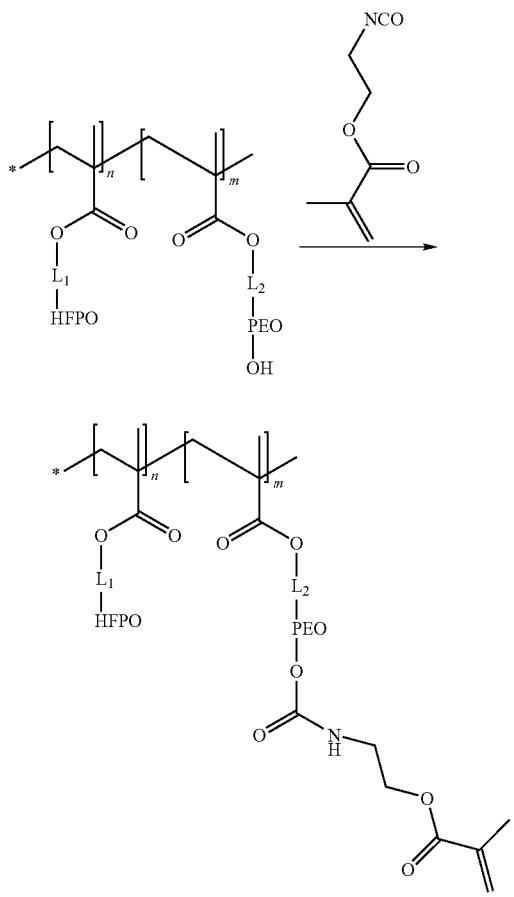

Useful poly(alkylene oxide) (meth)acrylate monomers with a reactive $R^A$ group, $M^{AO}$-$R^A$, include but are not limited to, CH$_2$=CHC(O)—(OC$_2$H$_4$)e-OH, CH$_2$=CMeC(O)—(OC$_2$H$_4$)e-OH, CH$_2$=CHC(O)—(OC$_3$H$_6$)e-OH, CH$_2$=CMeC(O)—(OC$_3$H$_6$)e-OH, CH$_2$=CHC(O)—(OC$_4$H$_8$)e-OH, CH$_2$=CMeC(O)—(OC$_4$H$_8$)e-OH, and CH$_2$=CHC(O)—NH(C$_2$H$_4$O)e-C$_2$H$_4$NHMe, wherein e is at least 4.

In another preferred embodiment, the perfluoropolyether (meth)acrylate monomer is first polymerized with poly(alkylene oxide) (meth)acrylate monomer and other (meth)acrylate monomer comprising reactive hydroxy group. The obtained perfluoropolyether polymer with hydroxy group is further reacted with $R^B$—(X)s, such as OCNC$_2$H$_4$OC(O)CMe=CH$_2$ by addition reaction via a urethane linkage. An exemplary reaction sequence is shown as follows:

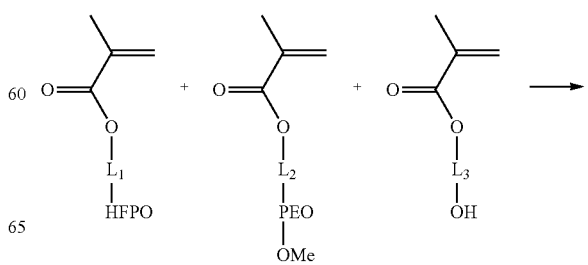

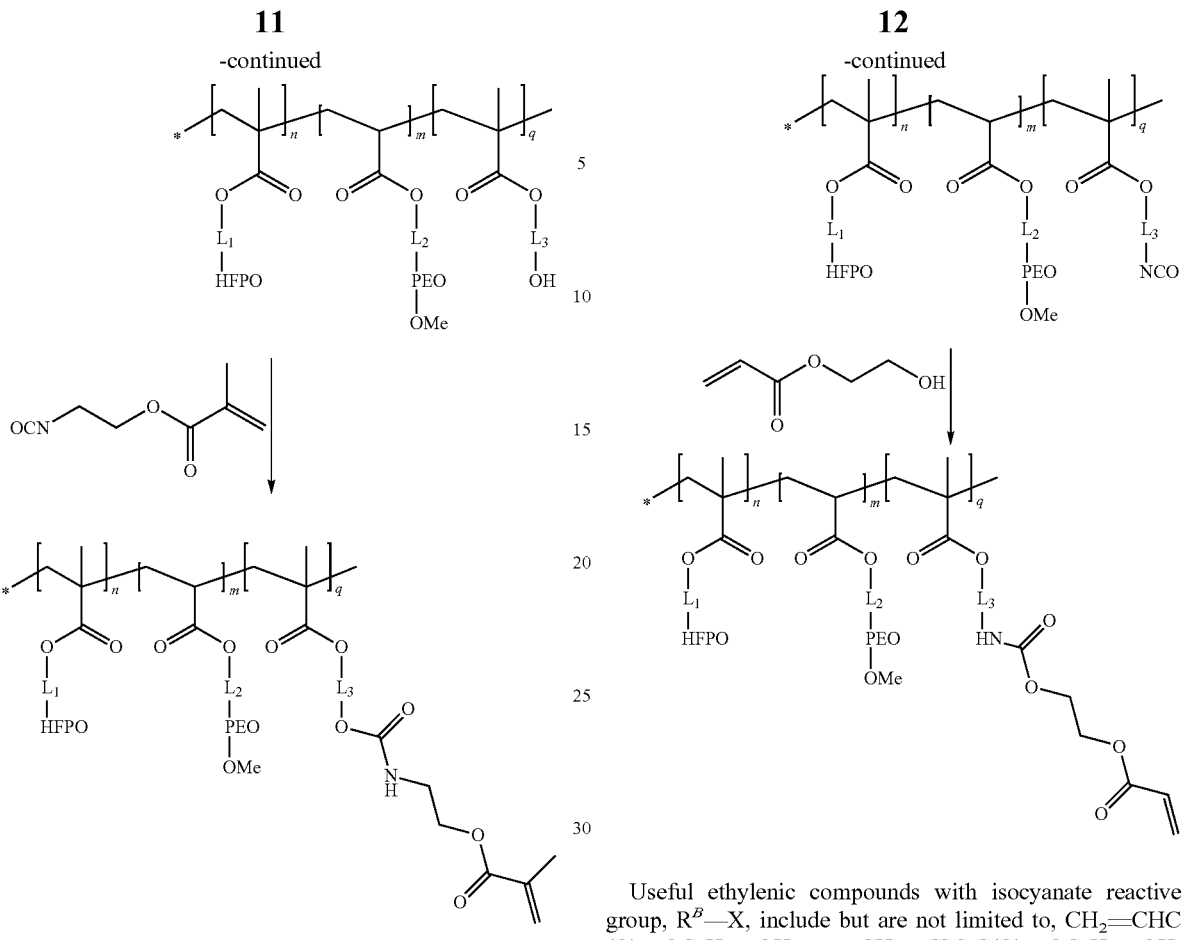

Examples of useful $M^{MA}$—$R^A$ include but are not limited to, $CH_2$=$CHC(O)$—$OC_2H_4$—OH, $CH_2$=$CMeC(O)$—$OC_2H_4$—OH, $CH_2$=$CHC(O)$—$OC_3H_6$—OH, $CH_2$=$CMeC(O)$—$OC_3H_6$—OH, $CH_2$=$CHC(O)$—$OC_4H_8$—OH, $CH_2$=$CMeC(O)$—$OC_4H_8$—OH, $CH_2$=$CHC(O)$—$NHC_2H_4NHCH_3$, $CH_2$=$CMeC(O)$—$NHC_2H_4NHCH_3$, $CH_2$=$CHC(O)$—$NHC_3H_6NHCH_3$, and $CH_2$=$CMeC(O)$—$NHC_3H_6NHCH_3$.

In another preferred embodiment, the perfluoropolyether (meth)acrylate monomer is first polymerized with poly(alkylene oxide) (meth)acrylate monomer and other (meth)acrylate monomer $M^{MA}$ comprising reactive isocyanate group. The obtained perfluoropolyether polymer with reactive isocyanate group is further reacted with $R^B$—(X)s wherein $R^B$ is an isocyanate reactive group selected from hydroxyl, or amine group.

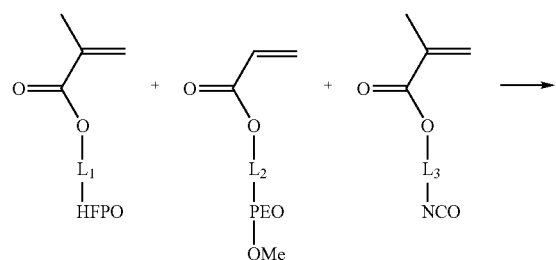

Useful ethylenic compounds with isocyanate reactive group, $R^B$—X, include but are not limited to, $CH_2$=$CHC(O)$—$OC_2H_4$—OH, $CH_2$=$CMeC(O)$—$OC_2H_4$—OH, $CH_2$=$CHC(O)$—$OC_3H_6$—OH, $CH_2$=$CMeC(O)$—$OC_3H_6$—OH, $CH_2$=$CHC(O)$—$OC_4H_8$—OH, $CH_2$=$CMeC(O)$—$OC_4H_8$—OH, $CH_2$=$CHC(O)$—$NHC_2H_4NHCH_3$, $CH_2$=$CMeC(O)$—$NHC_2H_4NHCH_3$ and $CH_2$=$CMeC(O)$—$NHC_3H_6NHCH_3$, $HOCH_2C(OC(O)CH$=$CH_2)_2$—$CH_2OC(O)CH$=$CH_2$, $CH_2$=$CHC(O)$—$(OC_2H_4)e$-OH, $CH_2$=$CMeC(O)$—$(OC_2H_4)e$-OH, $CH_2$=$CHC(O)$—$(OC_3H_6)e$-OH, $CH_2$=$CMeC(O)$—$(OC_3H_6)e$-OH, $CH_2$=$CHC(O)$—$(OC_4H_8)e$-OH, $CH_2$=$CMeC(O)$—$(OC_4H_8)e$-OH, and $CH_2$=$CHC(O)$—$NH(C_2H_4O)e$-$C_2H_4NHMe$, $CH_2$=$CHOCH_2CH_2OH$, $CH_2$=$CHCH_2OH$, and $CH_2$=$CH$-$Ph$-$CH_2OH$.

Other exemplary reaction sequences of this type are illustrated in the forthcoming examples, such as the synthesis of Copolymers D and J.

The molecular weight can be controlled by the reaction conditions, such as reaction time, reaction temperature, and initiator amount, etc. In the two step process it is preferred that the i) perfluoropolyether monomer(s); ii) poly(alkylene oxide) monomer(s); and iii) optional other monomer(s) are mono-ethylenically unsaturated (e.g. (meth)acrylate) monomers. It is also preferred that the (meth)acrylate monomer, $R^B$—X is monofunctional with respect to the reaction between $R^B$— with —$R^A$. However, the number of ethylenically unsaturated groups (i.e. r and/or s) incorporated via $R^B$—X may be greater than one, rendering the perfluoropolyether polymer thus formed a multi-(meth)acrylate polymer. An exemplary synthesis is shown in the forthcoming examples with reference to Copolymer D.

The molecular weight of the perfluoropolyether polymer may be also be controlled by adding a suitable chain transfer agent. Chain transfer agents can be used to promote chain termination and limit gel formation. Useful chain transfer agents include, for example, thiols, and polyhalocarbons. Examples of commercially available chain transfer agents include tetrabromomethane, 1-hexanethiol, 1-heptanethiol, 1-octanethiol, 1-nonanethiol, 1-decanethiol, 1-dodecanethiol, 1-octadecyl mercaptan, 1-pentadecanethiol, 1-hexadecyl mercaptan, tert-nonyl mercaptan, tert-hexadecyl mercaptan, tert-tetradecyl mercaptan, 1H,1H,2H,2H-perfluorohexanethiol and 1H,1H,2H,2H-perfluorododecyl-1-thiol.

Specifically, chain transfer agents may contain additional reactive groups, such as isocyanate reactive group which are useful for further introduction of curable ethylenic group at the terminal of perfluoropolyether polymer. The chain transfer agents with isocyanate reactive group are for example, but not limited to, 3-mercaptopropyltrimethoxysilane, 3-mercaptoproyltriethoxysilane, 2-mercaptoethyltriethoy silane, 3-mercaptopropylmethyldimethoxysilane, 2-mercapto-1-ethanol, 6-mercapto-1-hexanol, 11-mercapto-1-undecanol, 2-mercaptoethyl methyl amine, 2-(butylamino)ethanethiol, n-butyl 3-mercaptopropionate, thioglycolic acid, 3-mercaptopropionic acid, 4-mercaptobutyric acid, 11-mercaptoundecanoic acid, and 2-ethylehexyl 3-mercaptopropionate.

The chain transfer agent may also contain the requisite alkylene oxide repeat. The preparation of a mercaptan chain transfer agent with an alkylene oxide repeat unit can be made according to known procedures described in the literature, such as the estification of $CH_3$—O—$(CH_2CH_2O)$e-H with $HSCH_2CO_2H$ to form $CH_3$—O—$(CH_2CH_2O)$e-C(O)$CH_2SH$.

The perfluoropolyether (meth)acrylate polymer prepared from the two-step method can have a relatively low polydispersity. In some embodiments, the polydispersity is less than 5, 4, 3, 2.5 or 2. The Mw (as determined by GPC relative to polystyrene standards) of the perfluoropolyether (meth)acrylate polymer is typically at least 5,000 g/mole. The Mw is typically no greater than 100,000 g/mole. In some embodiments, the Mw preferably ranges from about 6,000 g/mole to about 50,000 g/mole.

The perfluoropolyether polymer described herein can be employed as the sole fluorinated component of a one-layer or two-layer hardcoat composition. For embodiments wherein high durability is desired, the one-layer hardcoat composition typically further comprises (e.g. surface modified) inorganic particles. Alternatively, a hardcoat containing inorganic particles can be provided beneath a perfluoropolyether containing surface layer. The thickness of the one-layer hardcoat surface layer or underlying hardcoat of a two-layer hardcoat is typically at least 0.5 microns, preferably at least 1 micron, and more preferably at least 2 microns. The thickness of the hardcoat layer is generally no greater than 25 microns. Preferably the thickness ranges from 3 microns to 5 microns. For a two-layer construction the cured surface layer typically has a thickness of at least about 10 nm and preferably at least about 25 nm. The surface layer typically has a thickness of less than about 200 nm, 100 nm, or 75 nm.

The perfluoropolyether polymer described herein may be employed alone or in combination with various other fluorinated compounds having at least one moiety selected from fluoropolyether, fluoroalkyl, and fluoroalkylene linked to at least one free-radically reactive group. When a second fluorinated compound is employed, it is typically preferred that such second fluorinated compound also comprises an HFPO-moiety. Various fluorinated materials that can be employed in combination with the perfluoropolyether polymeric material such as described in WO2006/102383.

The total amount of perfluoropolyether polymer ranges from 5% to 50% wt-%, preferably from 10% to 45 wt-%, and more preferably from 20% to 40 wt-%, of the total solids of the hardcoat composition. The hardcoat coating composition comprises at least 50 wt-%, 60 wt-%, 70 wt-%, 80 wt-%, 90 wt-% or 99.5 wt-% of one or more ethylenically unsaturated binder precursors. The binder precursor is typically a multifunctional free-radically polymerizable monomer(s) and/or oligomer(s) that can be photo-cured once the hardcoat composition has been coated. Useful multi-(meth)acrylate monomers and oligomers include, but not limited to:

(a) di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate;

(b) tri(meth)acryl containing compounds such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, tris(2-hydroxyethyl)isocyanurate triacrylate;

(c) higher functionality (meth)acryl containing compounds such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate.

Oligomeric (meth)acryl compounds such as, for example, urethane acrylates, polyester acrylates, and epoxy acrylates can also be employed.

The binder precursor can be the combination of above different kinds of multi-(meth)acrylate monomers and oligomers.

Such (meth)acrylate compounds are widely available from vendors such as, for example, Sartomer Company of Exton, Pa.; UCB Chemicals Corporation of Smyrna, Ga.; and Aldrich Chemical Company of Milwaukee, Wis.

In one embodiment, the hardcoat may comprise one or more N,N-disubstituted acrylamide and or N-substituted-N-vinyl-amide monomers as described in Bilkadi et al., U.S. Pat. No. 5,677,050. The hardcoat may be derived from a ceramer composition containing about 20 to about 80% ethylenically unsaturated monomers and about 5 to about 40% N,N-disubstituted acrylamide monomer or N-substituted-N-vinyl-amide monomer, based on the total weight of the solids in the ceramer composition.

In some embodiments, the hardcoat surface layer coating composition comprises at least 50 wt-%, 60 wt-%, 70 wt-%, 80 wt-%, 90 wt-%, or 99.8 wt-% of a monomer having at least three (meth)acrylate and preferably at least three acrylate groups.

The polymerizable composition for use a hardcoat surface layer or an underlying hardcoat layer preferably contains surface modified inorganic particles that add mechanical strength and durability to the resultant coating. The particles are typically substantially spherical in shape and relatively uniform in size. The particles can have a substantially monodisperse size distribution or a polymodal distribution obtained by blending two or more substantially monodisperse distributions. The inorganic oxide particles are typically non-aggregated (substantially discrete), as aggregation can result in precipitation of the inorganic oxide particles or gelation of the hardcoat. The inorganic oxide particles are typically colloidal in size, having an average particle diameter of about 0.001 to about 0.2 micrometers, less than about 0.05 micrometers, and less than about 0.03 micrometers. These size ranges facilitate dispersion of the inorganic oxide particles into the binder resin and provide ceramers with desirable surface properties and optical clarity. The average particle size of the inorganic oxide particles can be measured using transmission electron microscopy to count the number of inorganic oxide particles of a given diameter. The inorganic oxide particles can consist essentially of or consist of a single oxide such as silica, or can comprise a combination of oxides, such as silica and aluminum oxide, or a core of an oxide of one type (or a core of a material other than a metal oxide) on which is deposited an oxide of another type. Silica is a common inorganic particle. The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid), e.g., as described in U.S. Pat. Nos. 5,648, 407 (Goetz et al.); 5,677,050 (Bilkadi et al.) and 6,299,799 (Craig et al.). Aqueous sols (e.g. of amorphous silica) can be employed. Sols generally contain at least 2 wt-%, at least 10 wt-%, at least 15 wt-%, at least 25 wt-%, and often at least 35 wt-% colloidal inorganic oxide particles based on the total weight of the sol. The amount of colloidal inorganic oxide particle is typically no more than 50 wt-% (e.g. 45 wt-%). The surface of the inorganic particles can be "acrylate functionalized" as described in Bilkadi et al. The sols can also be matched to the pH of the binder, and can contain counterions or water-soluble compounds (e.g., sodium aluminate), all as described in Kang et al. '798.

Various high refractive index inorganic oxide particles can be employed such as for example zirconia ("$ZrO_2$"), titania ("$TiO_2$"), antimony oxides, alumina, tin oxides, alone or in combination. Mixed metal oxide may also be employed. Zirconias for use in the high refractive index layer are available from Nalco Chemical Co. under the trade designation "Nalco OOSSOO8" and from Buhler AG Uzwil, Switzerland under the trade designation "Buhler zirconia Z-WO sol". Zirconia nanoparticle can also be prepared such as described in U.S. Pat. Nos. 6,376,590 and 7,241,437.

The inorganic nanoparticles of the hardcoat are preferably treated with a surface treatment agent. Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of its surface with a surface treatment agent so that the stabilized particle can copolymerize or react with the polymerizable resin during curing. The incorporation of surface modified inorganic particles is amenable to covalent bonding of the particles to the free-radically polymerizable organic components, thereby providing a tougher and more homogeneous polymer/particle network.

In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependant upon several factors such as particle size, particle type, modifier molecular wt, and modifier type. In general, it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilylpropyl)methoxyethoxyethyl carbamate, N-(3-triethoxysilylpropyl)methoxyethoxyethyl carbamate, 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy)acetic acid, methoxyphenyl acetic acid, and mixtures thereof.

The surface modification of the particles in the colloidal dispersion can be accomplished in a variety known ways, such as described in U.S. Pat. Nos. 6,376,590 and 7,241,437.

A cyclic functional group subject to ring opening polymerization generally contains a heteroatom such as oxygen, sulfur or nitrogen, and preferably a 3-membered ring containing oxygen such as an epoxide.

A preferred combination of surface modifying agent includes at least one surface modifying agent having a functional group that is copolymerizable with the organic component (e.g. having an acrylate, methacrylate, or vinyl group) of the polymerizable resin and a second amphiphilic modifying agent, such as a polyether silane, that may act as a dispersant. The second modifying agent is preferably a polyalkyleneoxide containing modifying agent that is optionally co-polymerizable with the organic component of the polymerizable composition.

Surface modified colloidal nanoparticles can be substantially fully condensed. Non-silica containing fully condensed nanoparticles typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

To facilitate curing, polymerizable compositions described herein may further comprise at least one free-radical thermal initiator and/or photoinitiator. Typically, if such an initiator and/or photoinitiator are present, it comprises less than about 10 percent by weight, more typically less than about 5 percent of the polymerizable composition, based on the total weight of the polymerizable composition. Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. Nos. 4,654,233 (Grant et al.); 4,855,184 (Klun et al.); and 6,224,949 (Wright et al.). Useful free-radical thermal initiators include, for example, azo, peroxide, persulfate, and redox initiators, and combinations thereof. Useful free-radical photoinitiators include, for example, those known as useful in the UV cure of acrylate polymers such as described in WO2006/102383.

The method of forming the hardcoated article or hardcoat protective film includes providing a (e.g. light transmissible) substrate layer and providing the composition on the (optionally primed) substrate layer. The coating composition is dried to remove the solvent and then cured for example by exposure to ultraviolet radiation (e.g. using an H-bulb or other lamp) at a desired wavelength, preferably in an inert atmosphere (less than 50 parts per million oxygen) or an electron beam. Alternatively, a transferable hardcoat film may be formed coating the composition to a release liner, at least partially cured, and subsequently transferring from the release layer to the substrate using a thermal transfer or photoradiation application technique.

The composition can be applied as a single or multiple layers directly to an article or film substrate using conventional film application techniques. Although it is usually convenient for the film substrate to be in the form of a roll of continuous web, the coatings may be applied to individual sheets.

Thin coating layers can be applied to the optical substrate using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, Modern Coating and Drying Technology, VCH Publishers, NY 1992, ISBN 3-527-28246-7 and Gutoff and Cohen, Coating and Drying Defects: Troubleshooting Operating Problems, Wiley Interscience, NY ISBN 0-471-59810-0.

The hardcoat coating composition can be provided on a gloss or matte surface. Matte films typically have lower transmission and higher haze values than typical gloss films. For examples the haze is generally at least 5%, 6%, 7%, 8%, 9%, or 10% as measured according to ASTM D1003. Whereas gloss surfaces typically have a gloss of at least 130 as measured according to ASTM D 2457-03 at 60°; matte surfaces have a gloss of less than 120.

The surface can be roughened or textured to provide a matte surface. This can be accomplished in a variety of ways as known in the art including embossing the low refractive index surface with a suitable tool that has been bead-blasted or otherwise roughened, as well as by curing the composition against a suitable roughened master as described in U.S. Pat. Nos. 5,175,030 (Lu et al.) and 5,183,597 (Lu).

Matte low and high refractive index coatings can also be prepared by adding a suitably sized particle filler such as silica sand or glass beads to the composition. Such matte particles are typically substantially larger than the surface modified low refractive index particles. For example the average particle size typically ranges from about 1 to 10 microns. The concentration of such matte particles may range from at least 2 wt-% to about 10 wt-% or greater. At concentrations of less than 2 wt-% (e.g. 1.8 wt-%, 1.6 wt-%, 1.4 wt-%, 1.2 wt-%, 1.0 wt-%, 0.8 wt-%, 0.6 wt-%, the concentration is typically insufficient to produce the desired reduction in gloss (i.e. haze).

One exemplary matte film is commercially available from U.S.A. Kimoto Tech of Cedartown, Ga., under the trade designation "N4D2A."

The attraction of the hardcoat surface to lint can be further reduced by including an antistatic agent. For example, an antistatic coating can be applied to the (e.g. optionally primed) substrate prior to coating the hardcoat. The thickness of the antistatic layer is typically at least 20 nm and generally no greater than 400 nm, 300 nm, or to 200 nm.

The antistatic coating may comprise at least one conductive polymer as an antistatic agent. Various conductive polymers are known. Examples of useful conductive polymers include polyaniline and derivatives thereof, polypyrrole, and polythiophene and its derivatives. One particularly suitable polymer is poly(ethylenedioxythiophene) (PEDOT) such as poly(ethylenedioxythiophene) doped with poly(styrenesulfonic acid) (PEDOT:PSS) commercially available from H.C. Starck, Newton, Mass. under the trade designation "BAYTRON P". This conductive polymer can be added at low concentrations to sulfopolyester dispersions to provide antistatic compositions that provided good antistatic performance in combination with good adhesion particularly to polyester and cellulose acetate substrates.

In other embodiments, the antistatic coating or hardcoat composition may comprise conductive metal-containing particles, such as metals or semiconductive metal oxides. Such particles may also be described as nanoparticles having a particle size or associated particle size of greater than 1 nm and less than 200 nm. Various granular, nominally spherical, fine particles of crystalline semiconductive metal oxides are known. Such conductive particles are generally binary metal oxides doped with appropriate donor heteroatoms or containing oxygen deficiencies. Preferred doped conductive metal oxide granular particles include Sb-doped tin oxide, Al-doped zinc oxide, In-doped zinc oxide, and Sb-doped zinc oxide.

Various antistatic particles are commercially available as water-based and solvent-based dispersions. Antimony tin oxide (ATO) nanoparticle dispersions that can be used include a dispersion available from Air Products under the trade designation "Nano ATO 544A" (25 wt-% solids, water), 30 nm and 100 nm (20 wt-% solids, water) dispersions available from Advanced Nano Products Co. Ltd. (ANP), 30 nm and 100 nm ATO IPA sols (30 wt-%) also available from ANP, a dispersion available from Keeling & Walker Ltd under the trade designation "CPM10C" (19.1 wt-% solids), and a dispersion commercially available from Ishihara Sangyo Kaisha, Ltd under the trade designation "SN-100 D" (20 wt-% solids). Further, an antimony zinc oxide (AZO) IPA sol (20 nm, 20.8 wt-% solids) is available from Nissan Chemical America, Houston Tex. under the trade designations "CELNAX CX-Z2101P", "CELNAX CX-Z300H" (in water), "CELNAX CX-Z401M" (in methanol), and "CELNAX CX-Z653M-F" (in methanol).

For nanoparticle antistats, the antistatic agent is present in an amount of at least 20 wt-%. For conducting inorganic oxide nanoparticles, levels can be up to 80 wt % solids for refractive index modification. When a conductive polymer antistat is employed, it is generally preferred to employ as little as possible due to the strong absorption of the conductive polymer in the visible region. Accordingly, the concentration is generally no greater than 20 wt-% solid, and preferably less than 15 wt-%. In some embodiments the amount of conductive polymer ranges from 2 wt-% to 5 wt-% solids of the dried antistatic layer.

A variety of substrates can be utilized in the articles of the invention. Suitable substrate materials include glass as well as thermosetting or thermoplastic polymers such as polycarbonate, poly(meth)acrylate (e.g., polymethyl methacrylate or "PMMA"), polyolefins (e.g., polypropylene or "PP"), polyurethane, polyesters (e.g., polyethylene terephthalate or "PET"), polyamides, polyimides, phenolic resins, cellulose diacetate, cellulose triacetate, polystyrene, styrene-acrylonitrile copolymers, epoxies, and the like. Typically the substrate will be chosen based in part on the desired optical and mechanical properties for the intended use. Such mechanical properties typically will include flexibility, dimensional stability and impact resistance. The substrate thickness typically also will depend on the intended use. For most applications, a substrate thickness of less than about 0.5 mm is preferred, and is more preferably about 0.02 to about 0.2 mm. Self-supporting polymeric films are preferred. Films made from polyesters such as PET or polyolefins such as PP (polypropylene), PE (polyethylene) and PVC (polyvinyl chloride) are particularly preferred. The polymeric material can be formed into a film using conventional filmmaking techniques such as by extrusion and optional uniaxial or biaxial orientation of the extruded film. The substrate can be treated to improve adhesion between the substrate and the hardcoat layer, e.g., chemical treatment, corona treatment such as air or nitrogen corona, plasma, flame, or actinic radiation. If desired, an optional tie layer or primer can be applied to the substrate and/or hardcoat layer to increase the interlayer adhesion.

Various light transmissive optical films are known including but not limited to, multilayer optical films, microstructured films such as retroreflective sheeting and brightness enhancing films, (e.g. reflective or absorbing) polarizing films, diffusive films, as well as (e.g. biaxial) retarder films and compensator films such as described in U.S. Patent Application Publication No. 2004/0184150.

The hardcoat or protective film prepared from such hardcoat is suitable for use with various articles such as optical displays and display panels.

The term "optical display", or "display panel", can refer to any conventional optical displays, including but not limited to multi-character multi-line displays such as liquid crystal displays ("LCDs"), plasma displays, front and rear projection displays, cathode ray tubes ("CRTs"), and signage, as well as single-character or binary displays such as light emitting diodes ("LEDs"), signal lamps, and switches. The exposed surface of such display panels may be referred to as a "lens." The invention is particularly useful for displays having a viewing surface that is susceptible to being touched or contacted by ink pens, markers and other marking devices, wiping cloths, paper items and the like.

The protective coatings of the invention can be employed in a variety of portable and non-portable information display articles. These articles include PDAs, cell phones (including combination PDA/cell phones), LCD televisions (direct lit and edge lit), touch sensitive screens, wrist watches, car navigation systems, global positioning systems, depth finders, calculators, electronic books, CD and DVD players, projection television screens, computer monitors, notebook computer displays, instrument gauges, instrument panel covers, signage such as graphic displays and the like. The viewing surfaces can have any conventional size and shape and can be planar or non-planar, although flat panel displays are preferred. The coating composition or coated film, can be employed on a variety of other articles as well such as for example camera lenses, eyeglass lenses, binocular lenses, mirrors, retroreflective sheeting, automobile windows, building windows, train windows, boat windows, aircraft windows, vehicle headlamps and taillights, display cases, road pavement markers (e.g. raised) and pavement marking tapes, overhead projectors, stereo cabinet doors, stereo covers, watch covers, as well as optical and magneto-optical recording disks, and the like.

Various permanent and removable grade adhesive compositions may be coated on the opposite side (i.e. to the hardcoat) of the (e.g. protective film substrate) so the article can be easily mounted to a (e.g. display) surface. Suitable adhesive compositions include (e.g. hydrogenated) block copolymers such as those commercially available from Kraton Polymers of Westhollow, Tex. under the trade designation "Kraton G-1657", as well as other (e.g. similar) thermoplastic rubbers. Other exemplary adhesives include acrylic-based, urethane-based, silicone-based, and epoxy-based adhesives. Preferred adhesives are of sufficient optical quality and light stability such that the adhesive does not yellow with time or upon weather exposure so as to degrade the viewing quality of the optical display. The adhesive can be applied using a variety of known coating techniques such as transfer coating, knife coating, spin coating, die coating and the like. Exemplary adhesives are described in U.S. Patent Application Publication No. 2003/0012936. Several of such adhesives are commercially available from 3M Company, St. Paul, Minn. under the trade designations 8141, 8142, and 8161.

GLOSSARY

For the following defined terms, these definitions shall be applied, unless a different definition is given in the claims or elsewhere in the specification.

As used herein, "wt-%" refers to the sum of the solid components with the exception of solvent. Unless specified otherwise, the concentration of materials is typically expressed with reference to wt-% solids of the organic composition (i.e. prior to the addition of inorganic nanoparticles).

"Monovalent perfluoropolyether moiety" refers to a perfluoropolyether chain having one end terminated by a perfluoroalkyl group.

The recitation of numerical ranges by endpoints includes all numbers subsumed within the range (e.g. the range 1 to 10 includes 1, 1.5, 3.33, and 10).

Objects and advantages of this invention are further illustrated by the following examples, but the particular materials and amounts thereof recited in these examples, as well as other conditions and details, should not be construed to unduly limit this invention.

Perfluoropolyether Monomers

"HFPO-", as used in the Examples, unless otherwise noted, refers to the end group $F(CF(CF_3)CF_2O)_aCF(CF_3)$— of the methyl ester $F(CF(CF_3)CF_2O)_aCF(CF_3)C(O)OCH_3$ (HFPO-$C(O)CH_3$), wherein a averages about 6.84, with an average molecular weight of 1314 g/mol. It was prepared according to the method reported in U.S. Pat. No. 3,250,808 (Moore et al.), with purification by fractional distillation.

HFPO-Urethane Acrylate solution, as a control, was prepared according to application Ser. No. 11/277,162 (63541US002 HFPO urethane 1)

$HFPO\text{-}C(O)N(H)CH_2CH_2OC(O)CMe\!=\!CH_2$ ("HFPO-MAr"), average molecular weight 1344) was prepared by a procedure similar to that described in U.S. Publication No. 2004-0077775, entitled "Fluorochemical Composition Comprising a Fluorinated Polymer and Treatment of a Fibrous Substrate Therewith," filed on May 24, 2002, for Synthesis of $(HFPO)_x$-methacrylate.

CN4000, fluorinated acrylate oligomer, Sartomer, Exton, Pa.

Monomers Comprising Alkylene Oxide Repeat Units
MeO-PEO-MAr-1100, $CH_3O\text{—}(C_2H_4O)_n\text{—}C(O)CMe\!=\!CH_2$, Mw~1100, Aldich;
MeO-PEO-Ar-454, $CH_3O\text{—}(C_2H_4O)_n\text{—}C(O)CH\!=\!CH_2$, Mw~454, Aldich;
HO-PEO-MAr-360, Poly(ethylene glycol) methacrylate, Mn=~360, Aldich;
SR604, polypropylene glycol monomethacrylate, Sartomer, Exton, Pa.
PEGDA: Poly(ethylene glycol) diacrylate, Mw~700, Aldrich;
(Meth)acrylate Monomers
IEM, $OCNC_2H_4OC(O)CMe\!=\!CH_2$, Aldich;
HEMA, $CH_2\!=\!CMeCO_2C_2H_4OH$, Aldrich;
HEA, $CH_2\!=\!CHCO_2C_2H_4OH$, Aldrich;
SR399, dipentaerythritol pentaacrylate, Sartomer, Exton, Pa.;
SR444, pentaerythritol triacrylate, Sartomer, Exton, Pa.;
Copolymerizable Silicone Monomer
Metharyloxypropyl terminated polydimethylsiloxane, Mw~500-700, Gelest;
A-189, $HSC_3H_6Si(OMe)_3$, chain transfer agent available from Silquest;
2-Mercaptoethanol, $HSCH_2CH_2OH$, available from Aldrich.
Vazo 52, and Vazo 67, thermo-initiators, DuPont, Del.
Preparation of Polymerizable Perfluoropolyether Polymers
1. Copolymer a (Lacking Polymerizable (Meth)Acrylate Group)

In a 4 Oz bottle with a stir bar, charged with 4.377 g of HFPO-MAr (Mw~1344), 7.0 g of MeO-PEO-MAr (Mw ~1100, Aldrich), 1.0 g of Silquest A-189, 0.35 g of Vazo 67, and 40 g of MEK. The solution was bubbled with $N_2$ for one minute. The bottle was sealed and the solution was polymerized at 70° C. for 24 hours under constant stirring, resulting in a clear solution with 23.6% wt.

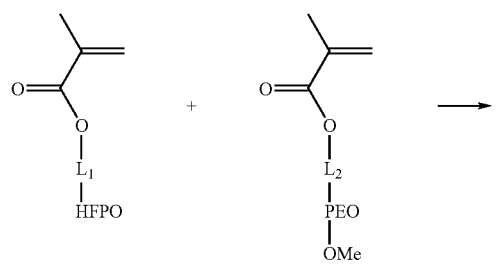

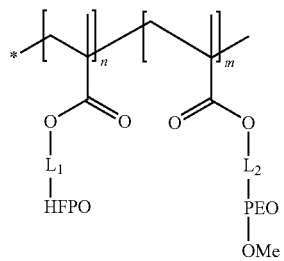

2. (Meth)acrylate Copolymer B

In a 4 Oz bottle with a stir bar, charged with 4.0 g of HFPO-MAr (Mw~1344), 6.0 g of HO-PEO-MAr (Mn~360, Aldrich), 0.5 g of Silquest A-189, 0.29 g of Vazo 67, and 40 g of ethyl acetate. The solution was bubbled with $N_2$ for one minute. The bottle was sealed and the solution was polymerized at 70° C. for 24 hours under constant stirring. After the temperature was cooled down to room temperature, 2.5 of IEM (Mw=155, Aldrich) and 0.11 of dibutyl tin dilaurate were added. The resulting solution was then stirred at 70° C. for additional 2 hours, yielding a clear solution with 25% wt. GPC analysis showed Mw=16,800; Mn=8,610, and P=1.95.

3. (Meth)acrylate Copolymer C

In a 4 Oz bottle with a stir bar, charged with 8.0 g of HFPO-MAr (Mw~1344), 8.0 g of MeO-PEO-Ar (Mw~454, Aldrich), 4 g of 2-hydroxyethyl methacrylate, 0.216 g of Silquest A-189, 0.765 g of Vazo 67, and 60 g of ethyl acetate. The solution was bubbled with $N_2$ for one minute. The bottle was sealed and the solution was polymerized at 70° C. for 24 hours under constant stirring. After the temperature was cooled down to room temperature, 4.76 of IEM (Mw=155, Aldrich), 14.3 g of ethyl acetate and 0.11 g of dibutyl tin dilaurate were added. The resulting solution was then stirred at 70° C. for additional 2 hours, yielding a clear solution with 25% wt. GPC analysis showed Mw=22,800; Mn=8,500, and P=2.68.

4. (Meth)acrylate Copolymer D

In a 4 Oz bottle with a stir bar, charged with 4.0 g of HFPO-MAr (Mw~1344), 4.06 g of MeO-PEO-Ar (Mw~454, Aldrich), 2.0 g of IEM, 0.5 g of Silquest A-189, 0.2 g of Vazo 67, and 40 g of ethyl acetate. The solution was bubbled with $N_2$ for one minute. The bottle was sealed and the solution was polymerized at 70° C. for 24 hours under constant stirring. After the temperature was cooled down to room temperature, 4.6 g of SR 444 (Sartomer, Exton, Pa.) and 0.1 of dibutyl tin (IV) dilaurate were added. The resulting solution was then stirred at 70° C. for additional 2 hours, yielding a clear solution with 27% wt.

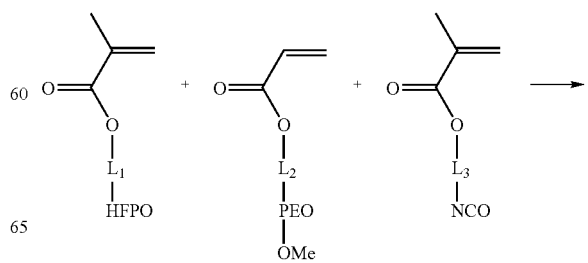

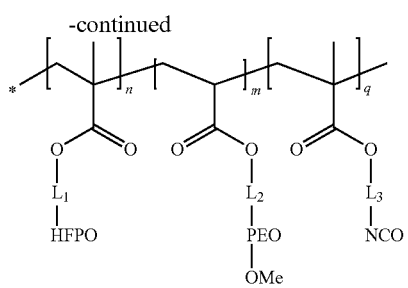

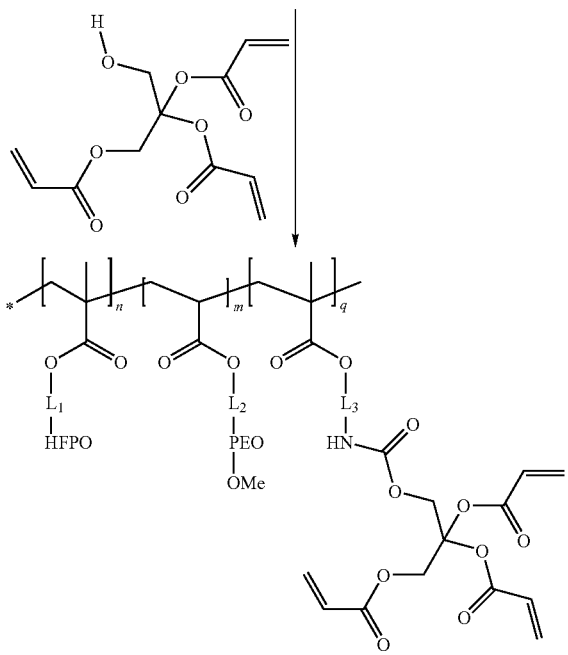

5. (Meth)acrylate Copolymer E

In a 4 Oz bottle with a stir bar, charged with 4 g of HFPO-MAr (Mw~1344), 4.06 g of MeO-PEO-Ar (Mn~454, Aldrich), 2 g of IEM, 0.5 g of Silquest A-189, 0.2 g of Vazo 67, and 40 g of ethyl acetate. The solution was bubbled with N₂ for one minute. The bottle was sealed and the solution was polymerized at 70° C. for 24 hours under constant stirring. After the temperature was cooled down to room temperature, 1.49 g of 2-hydroxyethyl acrylate (Aldrich) and 0.1 g of dibutyl tin (IV) dilaurate were added. The resulting solution was then stirred at 70° C. for additional 2 hours, yielding a clear solution with 22% wt.

6. (Meth)acrylate Copolymer F

In a 4 Oz bottle with a stir bar, charged with 4.0 g of HFPO-MAr (Mw~1344), 4.0 g of SR604, 2.0 g of 2-hydroxyethyl methacrylate, 0.1 g of Silquest A-189, 0.235 g of Vazo 67, and 30 g of ethyl acetate. The solution was bubbled with N₂ for one minute. The bottle was sealed and the solution was polymerized at 70° C. for 24 hours under constant stirring. After the temperature was cooled down to room temperature, 2.38 g of IEM (Aldrich), 7.16 g of ethyl acetate, and 0.1 g of dibutyl tin (IV) dilaurate were added. The resulting solution was then stirred at 70° C. for additional 2 hours, yielding a clear solution with 25% wt.

7. (Meth)acrylate Copolymer G

In a 12 Oz glass jar, 4.2 g of HFPO-MAr (Mw~1344), 6.5 g of poly(ethylene glycol) diacrylate (Mw~700, Aldrich), 1.1 g of dipentaerythritol pentaacrylate (SR399, Sartomer, Pa.), 1.0 g of Vazo 52 (DuPont, Del.), and 88 g of ethyl acetate were mixed together. The solution was bubbled with N₂ for one minute. The bottle was sealed and the solution was polymerized at 80° C. for 1 hour under constant stirring, resulting in a clear solution with 11.8% wt. The solution was then kept in refrigerator (4° C.).

9. (Meth)acrylate Copolymer H

In a 12 Oz glass jar, 4.0 g of CN4000 (Sartomer, Pa.), 6.0 g of poly(ethylene glycol) diacrylate (Mw~700, Aldrich), 1.0 g of dipentaerythritol pentaacrylate (SR399, Sartomer, Pa.), 1.0 g of Vazo 52 (DuPont, Del.), and 88 g of ethyl acetate were mixed together. The solution was bubbled with N₂ for two minute. The bottle was sealed and the solution was polymerized at 80° C. for 2.5 hours under constant stirring, resulting in a clear solution with 11% wt. The solution was then kept in refrigerator (4° C.).

10. (Meth)acrylate Copolymer I

In a 12 Oz glass jar, 3.7 g of HFPO-MAr (Mw~1344), 6.4 g of poly(ethylene glycol) diacrylate (Mw~700, Aldrich), 1.28 g of 2-hydroethyl methacrylate (Aldrich), 1.0 g of Vazo 52 (DuPont, Del.), and 87.8 g of ethyl acetate were mixed together. The solution was bubbled with N₂ for two minute. The bottle was sealed and the solution was polymerized at 80° C. for 3 hours under constant stirring, resulting in a clear solution. After the temperature was cooled down, 1.526 of IEM (Mw=155, Aldrich) and few drops of dibutyl tin dilaurate were added. The resulting solution was then stirred at room temperature for additional 2 hours, yielding a clear solution with 13.6% wt. The solution was then kept in refrigerator (4° C.).

11. (Meth)acrylate Copolymer J

In a 12 Oz glass jar, 4 g of HFPO-MAr (Mw~1344), 5 g of poly(ethylene glycol) diacrylate (Mw~700, Aldrich), 2.4 g of HO-PEO-MAr (Mn ~360, Aldrich), 1.0 g of Vazo 52 (DuPont, Del.), and 87.8 g of ethyl acetate were mixed together. The solution was bubbled with N₂ for two minute. The bottle was sealed and the solution was polymerized at 80° C. for 3 hours under constant stirring, resulting in a clear solution. After the temperature was cooled down, 1.03 of IEM (Mw=155, Aldrich) and few drops of dibutyl tin dilaurate were added. The resulting solution was then stirred at room temperature for additional 2 hours, yielding a clear solution with 12.4% wt. The solution was then kept in refrigerator (4° C.).

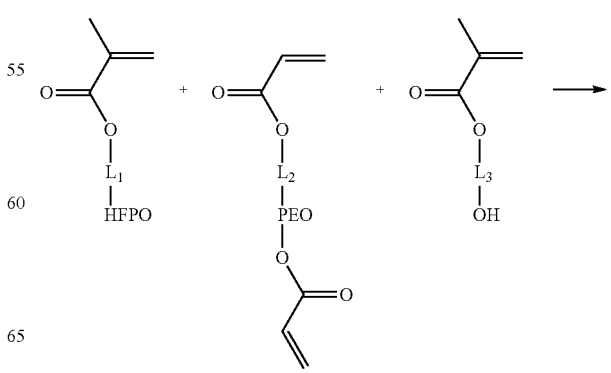

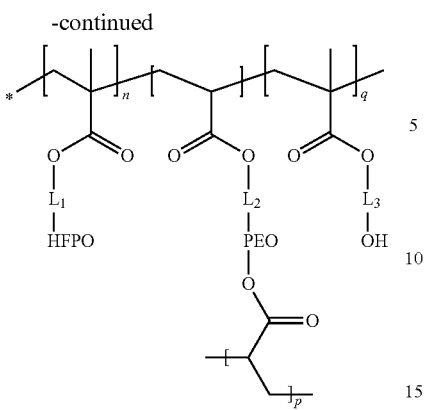
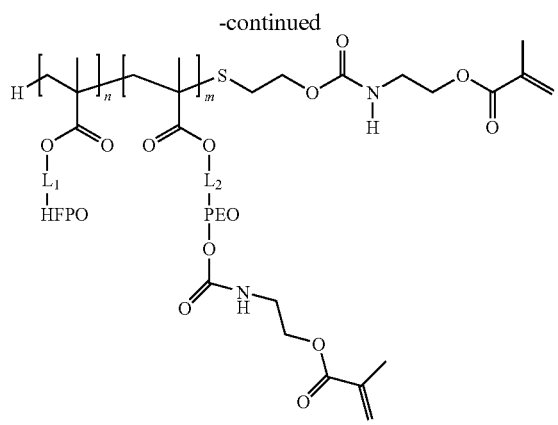
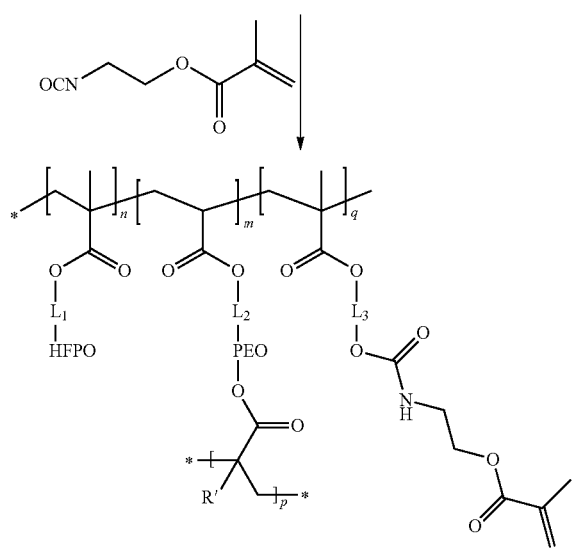

12. (Meth)acrylate Copolymer K

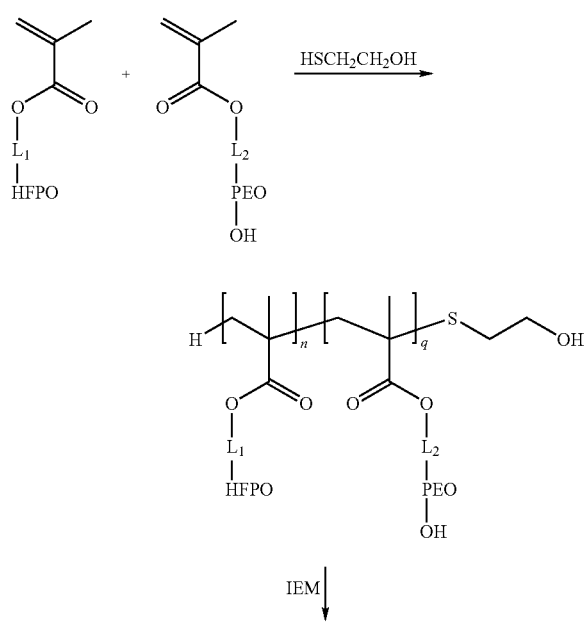

In a 4 Oz bottle with a stir bar, charged with 4.0 g of HFPO-MAr (Mw~1344), 6.0 g of HO-PEO-MAr (Mn~360, Aldrich), 0.3 g HSCH$_2$CH$_2$OH, 0.30 g of Vazo 67, and 40 g of ethyl acetate. The solution was bubbled with N$_2$ for one minute. The bottle was sealed and the solution was polymerized at 70° C. for 24 hours under constant stirring. After the temperature was cooled down to room temperature, 2.5 of IEM (Mw=155, Aldrich) and 0.10 of dibutyl tin dilaurate were added. The resulting solution was then stirred at 70° C. for additional 2 hours, yielding a clear solution with 23.8% wt.

Preparation of 3M 906 Hardcoat

The ceramer hardcoat base compositions used in the examples were made as described in column 10, line 25-39 and Example 1 of U.S. Pat. No. 5,677,050 to Bilkadi, et al.

Testing Methods:

Optical Property Measurements:

The haze (% H) and transmission (% T) were measured using a Haze-Gard Plus (BYK-Gardner USA, Columbia, Md.).

Steel Wool (SW) Testing:

The abrasion resistance of the cured films was tested cross-web to the coating direction by use of a mechanical device capable of oscillating steel wool fastened to a stylus (by means of a rubber gasket) across the film's surface. The stylus oscillated over a 10 cm wide sweep width at a rate of 3.5 wipes/second wherein a "wipe" is defined as a single travel of 10 cm. The stylus had a flat, cylindrical geometry with a diameter of 1.25 inch (3.2 cm). The device was equipped with a platform on which weights were placed to increase the force exerted by the stylus normal to the film's surface. The steel wool was obtained from Rhodes-American, a division of Homax Products, Bellingham, Wash. under the trade designation "#0000-Super-Fine" and was used as received. A single sample was tested for each example, with the weight in grams applied to the stylus and the number of wipes employed during testing reported. The film was then visually examined and rated for scratch resistance using the following scale:

The quality rating of the test was determined by the number of scratched lines present on the surface. Four quality ratings are assigned: NS for no evidence of scratched lines, SS for few (1 to 3) scratched lines, S for more scratched lines (3 to 10), HS for obviously continued scratched lines, respectively.

Each of the samples were tested using a 1 kg and 100 wipes for durability.

Contact Angle (CA):

The coatings cured on the substrate were rinsed for 1 minute by hand agitation in IPA before being subjected to measurement of water and hexadecane contact angles. Measurements were made using as-received reagent-grade hexadecane (Aldrich) and deionized water filtered through a filtration system obtained from Millipore Corporation (Billerica, Mass.), on a video contact angle analyzer available as product number VCA-2500XE from AST Products (Billerica, Mass.). Reported values are the averages of measurements on at least three drops measured on the right and the left sides of the drops. Drop volumes were 5 µL for static measurements and 1-3 µL for advancing and receding. For hexadecane, only advancing and receding contact angles are reported because static and advancing values were found to be nearly equal.

Ink Repellency Test:

This test was used to measure the ink repellency of the cured coatings on the substrate. A line is drawn across the surface of a coated polycarbonate plaque using a Sharpie marker (available from Sanford, Bellwood, Ill.). The samples were rated for appearance and for the ability to repel a black Sharpie marker.

| Ink Repellency Test Ratings | |
|---|---|
| Ranking | Description |
| 1 | Ink beaded into discrete hemispherical droplets |
| 2 | Ink beaded into discrete elongated droplets |
| 3 | Ink line narrowed and discontinuous |
| 4 | Ink line continuous and unnarrowed |

Cellulose Haze Test:

After the coated PET film was prepared it was allowed to condition for 24 hours at ambient temperature and 50%+/−10% relative humidity to allow it to be charged. After conditioning each coated PET sample was cleaned with a Simco "Viper" static neutralizing gun to remove any dust. Then 0.35 grams of alpha-cellulose (C-8002) from Sigma Chemical Company (St. Louis, Mo.) was applied to the top of the coating in a 7 cm diameter area. The coated film was tilted back and forth several times to allow the cellulose to evenly coat the 7 cm. diameter test area. The excess cellulose was then shaken off and the haze of the coating plus cellulose was measured according to ASTM D1003.

Surface Resistance Measurements were performed using a ProStat (Bensenville, Ill.) PRS-801 resistance system equipped with a PRF-911 concentric ring fixture. Output values in ohms were converted to ohms/sq by multiplying the measured values by 10 according to the documentation supplied with the instrument. Surface resistivity measurements were made at ambient laboratory humidity of 30-40%. Three measurements were taken on a single film substrate, reporting the average measurement.

Hardcoat Coating Composition Comprising Polymerizable Perfluoropolyether Polymer Additive Formulation #1—

In a glass jar, 50 g of the hardcoat coating solution (50% solid), 2.0 g of Copolymer A (23.6% wt in MEK), and 28 g of ethyl acetate were mixed together under stirring.

Formulations #2-5—

The coating solutions were prepared according to Formulation 1, but adding 2.0 g of Copolymer B-E (20~25% wt solid in ethyl acetate).

Comparative Examples 1 and 2

Comparative Formulation #1 (CF-1)

In a small glass jar, 5 g of the hardcoat coating solution (50% wt solid) and 3.0 g of ethyl acetate was mixed together.

Comparative Formulation #2 (CF-2)

In a small glass jar, 100 g of the hardcoat solution (50% wt solid), 0.45 g of HFPO-urethane acrylates (30% solid) in MEK, and 3.0 g of ethyl acetate were mixed together.

The coating solutions were applied using #12 wire-wound rod (obtained from RD Specialties, Webster, N.Y.) onto primed side of PET film obtained from DuPont under the trade designation "Melinex 618". The resulting films were then dried in an oven 90° C. for 1 min, and then cured using a Fusion UV Systems Inc. Light-Hammer 6 UV (Gaithersburg, Md.) processor equipped with an H-bulb, operating under nitrogen atmosphere at 100% lamp power at a line speed of 30 feet/min for 2 passes.

TABLE 1

Performance of Cured Hardcoat Surface Layer on PET Substrate

| Form # | Additive | Water CA Static/ Adv/Rec | Hexadecane CA Adv/Rec | Initial Ink Rep. | SW Durability 1 kg/100 wipes | Ink Rep. after SW Testing |
|---|---|---|---|---|---|---|
| CF1 | None | NM* | NM | 4 | NS** | 4 |
| CF2 | HFPO-Urethane Acrylate 1 | 101/109/73 | 63/57 | 1 | NS | 1 |
| 1 | Copolymer A | 105/108/64 | 70/60 | 1 | NS | 4 |
| 2 | Copolymer B | 107/119/82 | 70/64 | 1 | NS | 1 |
| 3 | Copolymer C | 105/113/74 | 68/58 | 1 | NS | 1 |
| 4 | Copolymer D | 106/115/77 | 69/63 | 1 | NS | 1 |
| 5 | Copolymer E | 106/115/78 | 69/62 | 1 | NS | 1 |
| 6 | Copolymer F | 107/116/83 | 69/64 | 1 | NS | 1 |

*NM, Not measure because of poor repellent;
**NS, No scratch.

As shown in Table 1, all hardcoat with perfluoropolyether polymer additive showed excellent water, oil and ink repellent in comparison with that without fluorochemical additives. All formulations except Form#1 showed excellent steel wood (SW) test durability, indicating the crosslinkable (meth)acrylate group in the additives is important for achieving good durability.

Preparation of "AS PET" Films

The hardcoat was coated onto an antistatic layer that was formed on the PET as follows: A coating solution was prepared by combining 970.8 g deionized water, 19.23 g of PEDOT/PSS (Baytron® P from H.C. Starck, 1.3 wt % solids), 7.5 g of surfactant (Tomadol® 25-9 from Tomah Products, 10 wt % in deionized water), and 2.5 g N-methylpyrrolidinone. This deep blue solution (0.025 wt % PEDOT/PSS) was coated on primed 5 mil PET film (prepared according to Example 29 of U.S. Pat. No. 6,893,731 B2)

For the Cellulose Surface Attraction Test, the coating solution was applied on both Melinex 618 PET and "AS PET" films using a #12 wire-wound rod (obtained from RD Specialties, Webster, N.Y.)". The resulting films were then dried in an oven 90° C. for 1 min, and then cured as described above.

TABLE 2

Cellulose Surface Attraction of Cured Hardcoat Surface Layer on PET and AS PET Substrate

| Form# | Substrates | Cellulose Test H % | Substrates* | Cellulose Test* H % |
|---|---|---|---|---|
| CF1 | PET | 6 | AS PET | 2~3 |
| CF2 | PET | 30 | AS PET | 20 |
| 1 | PET | 4 | AS PET | 1 |
| 2 | PET | 4 | AS PET | 1 |
| 3 | PET | 5 | AS PET | 2 |
| 4 | PET | 7 | AS PET | 4 |
| 5 | PET | 11 | AS PET | 6 |
| 6 | PET | 9 | AS PET | 3 |

As shown in Table 2, the hardcoat having a perfluoropolyether polymer additive (CF2) lacking alkylene oxide repeat units exhibited significantly increased haze in comparison with the hardcoat without any perfluoropolyether polymer additive (CF1). However, the hardcoat prepared from perfluoropolyether polymers comprising poly(alkylene oxide) repeat units, i.e. Formulation #1-6 exhibited low lint-attraction.

Formulation #7—

In a glass jar, 50 g of 3M 906 hardcoat solution (50% wt), 3.0 g of HFPO/PEG copolymer F solution (11.8% wt in ethyl acetate), and 27 g of ethyl acetate were mixed together under stirring.

Formulation #8-10—

The formulations were prepared according to Formulation 6, but adding 3.0 g of copolymer G-J solution as prepared in ethyl acetate.

The coating solution Formulations 7-11 were applied using a #12 wire-wound rod onto primed side of PET, and then dried and cured as described above.

For the cellulose test, the coating solution Formulations #7-11 were applied on both Melinex 618 PET and "AS PET" films using #12 wire-wound rod (obtained from RD Specialties, Webster, N.Y.)", and then dried and cured as described above.

TABLE 4

Cellulose Surface Attraction of Cured Hardcoat Surface Layer on PET and AS PET Substrate

| Form# | Substrates | Cellulose Test H % | Substrates* | Cellulose Test* H % after SW testing |
|---|---|---|---|---|
| CF1 | PET | 6 | ASPET | 2~3 |
| CF2 | PET | 30 | ASPET | 20 |
| 7 | PET | 6 | ASPET | 2 |
| 8 | PET | 5 | ASPET | 3 |
| 9 | PET | 6 | ASPET | 3 |
| 10 | PET | 7 | ASPET | 2 |

Formulations #11-13

TM-CH-1 antistatic hardcoat solution is commercially available from Sumitomo Osaka Cement. This material comprises antimony-doped tin oxide (ATO) nanoparticles and UV-curable resins at total solid of 30% wt in mixed solvent system comprising methyl ethyl ketone, diacetone alcohol, and water.

The formulations were prepared by adding Copolymer B, Copolymer D, and Copolymer H at 1.1% wt level of the total solid of TM-CH-1 coating.

As an example, 8.5 g of TM-CH-1 antistatic hardcoat solution was added to a small jar, and then 0.275 g of Copolymer B solution (11.8% wt in ethyl acetate) was added. The solution was mixed homogenous under stirring.

The resulting solution was then applied on top of "Melinex 618" primed PET films using a #12 wire-wound rod (obtained from RD Specialties, Webster, N.Y.). The resulting films were then dried in an oven 70° C. for 2 min, then cured using a Fusion UV-Systems Inc. Light-Hammer 6 UV (Gaithersburg, Md.) processor equipped with an H-bulb, operating under nitrogen atmosphere at 100% lamp power at a line speed of 30 feet/min (2 passes).

Comparative Examples 3 and 4

Comparative Formulation #3 ($CF_3$)

TM-CH-1 solution was used as supplied.

Comparative Formulation #4 ($CF_4$)

In a small galls jar, 8.5 g of TM-CH-1 hardcoat solution, 0.45 g of HFPO-urethane acrylates (30% solid) in MEK were mixed together.

TABLE 3

Performance of Cured Hardcoat Surface Layer on PET Substrate

| Form # | Additive | Water CA Static/ Adv/Rec | Hexadecane CA Adv/Rec | Initial Ink Rep. | SW Durability 1 kg/100 wipes | Ink Rep. after SW Testing |
|---|---|---|---|---|---|---|
| CF2 | HFPO-Urethane Acrylate 1 | 101/109/73 | 63/57 | 1 | NS | 1 |
| 7 | Copolymer G | 106/116/82 | 70/66 | 1 | NS | 2 |
| 8 | Copolymer H | 102/113/88 | 66/60 | 1 | NS | 2 |
| 9 | Copolymer I | 108/117/87 | 69/62 | 1 | NS | 1 |
| 10 | Copolymer J | 107/119/83 | 70/63 | 1 | NS | 1 |

The coating solutions were applied and cured as described above.

TABLE 5

Performance of Cured Hardcoat Surface Layer on PET Substrate

| Form # | Additives | Water Static/Adv/Rec CA | Hexadecane Adv/Rec CA | Ink Repellence | SW Durability | Ink Repellence after SW |
|---|---|---|---|---|---|---|
| CF3 | None | NM | NM | 4 | NS | 4 |
| CF4 | HFPO-Urethane Acrylate 1 | 110/118/93 | 69/63 | 1 | NS | 1 |
| 12 | Copolymer G | 103/108/69 | 65/54 | 1 | NS | 1 |
| 13 | Copolymer H | 102/111/89 | 66/62 | 1 | NS | 1 |
| 14 | Copolymer B | 106/117/83 | 69/62 | 1 | NS | 1 |

TABLE 6

Cellulose Surface Attraction of Cured Hardcoat Surface Layer on PET Substrate

| Form# | Substrates | Surface Resistance (ohms/sq) | Cellulose Test H % |
|---|---|---|---|
| CF3 | PET | $5.7 \times 10^9$ | 2 |
| CF4 | PET | $9.7 \times 10^9$ | 17 |
| 12 | PET | $6.4 \times 10^9$ | 1 |
| 13 | PET | $5.5 \times 10^9$ | 2 |
| 14 | PET | $8.7 \times 10^9$ | 1 |

What is claimed is:

1. A perfluoropolyether polymer is represented by the general formula:

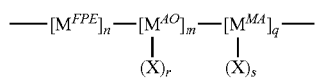

wherein $M^{FPE}$ represents repeat units derived from one or more mono-(meth)acrylate monomers having a perfluoropolyether group, the monomer having a Mw of at least 600 g/mole, and the polymer comprises 10 to 50 wt-% of $M^{FPE}$;

$M^{AO}$ represents repeat units derived from one or more (meth)acrylate monomers having an alkylene oxide repeat units;

$M^{MA}$ represents units derived from (meth)acrylate monomers that lack a perfluoropolyether group and an alkylene oxide repeat unit;

each X independently comprises an ethylenically unsaturated group;

n and m each independently represent a value of 1 to 100 wherein the sum of n+m is at least 3;

q represents a value of 0 to 100; and r and s each independently represent a value of 0 to 6 with the proviso that the sum of r+s is at least 1;

wherein the $M^{FPE}$ units are bonded to the $M^{AO}$ units by means of polymerized (meth)acrylate linkages of a (meth)acrylate polymer backbone; and when q is 0, $M^{AO}$ is bonded to X by means of a urethane linkage and the polymer comprises $M^{AO}$, $M^{MA}$, or a combination thereof are bonded to X by means of a urethane linkage.

2. The perfluoropolyether polymer of claim 1 wherein $M^{AO}$ comprises at least 4 ethylene oxide repeat units.

3. The perfluoropolyether polymer of claim 1 wherein $M^{FPE}$ comprises a HFPO-moiety having the formula F(CF(CF$_3$)CF$_2$O)aCF(CF$_3$)— wherein a ranges from 4 to 15.

4. The perfluoropolyether polymer of claim 3 wherein the polymer has the general structure:

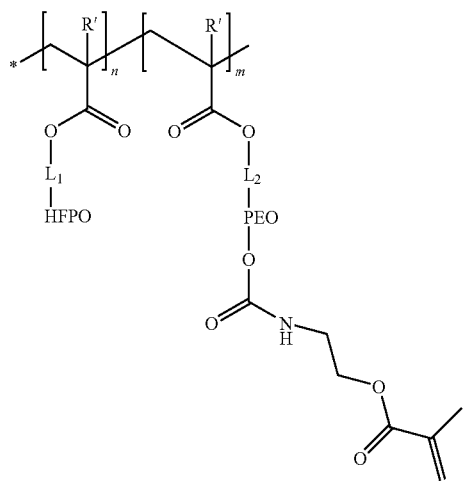

wherein PEO is a polyethylene oxide comprising at least four repeat units, $L_1$ and $L_2$ are independently linking groups, and R' is independently H or Me.

5. The perfluoropolyether polymer of claim 3 wherein the polymer has the general structure:

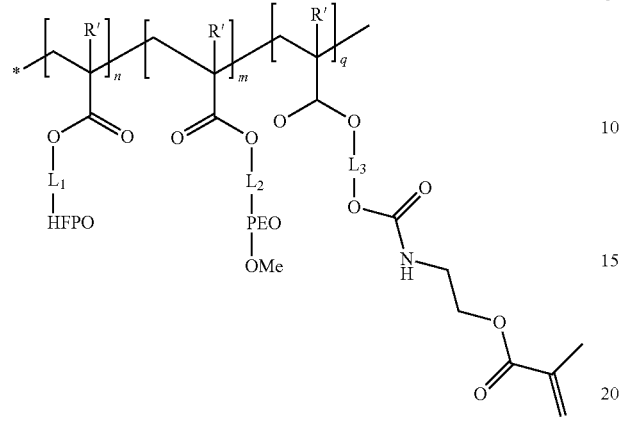

wherein PEO is a polyethylene oxide comprising at least four repeat units, $L_1$ and $L_2$ are independently linking groups, $L_3$ is —$C_2H_4$—, and R' is independently H or Me.

6. The perfluoropolyether polymer of claim 3 wherein the polymer has the general structure:

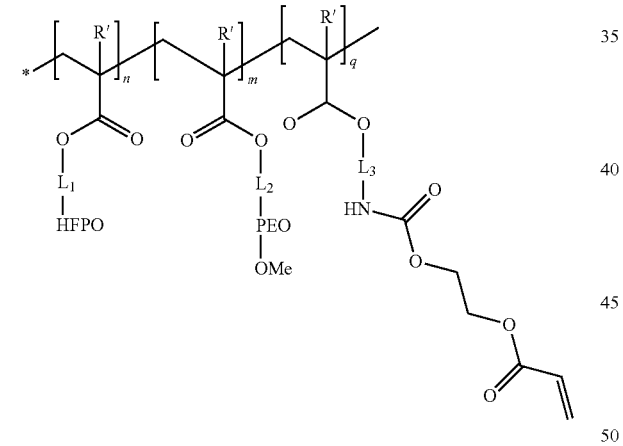

wherein PEO is a polyethylene oxide comprising at least four repeat units, $L_1$ and $L_2$ are independently linking groups, $L_3$ is —$C_2H_4$—, and R' is independently H or Me.

7. The perfluoropolyether polymer of claim 3 wherein the polymer has the general structure:

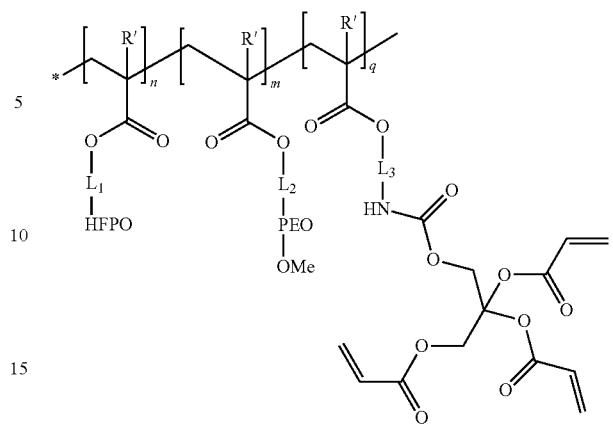

wherein PEO is a polyethylene oxide comprising at least four repeat units, $L_1$ and $L_2$ are independently linking groups, $L_3$ is —$C_2H_4$—, and R' is independently H or Me.

8. The perfluoropolyether polymer of claim 3 wherein the polymer is hyperbranched having the general structure:

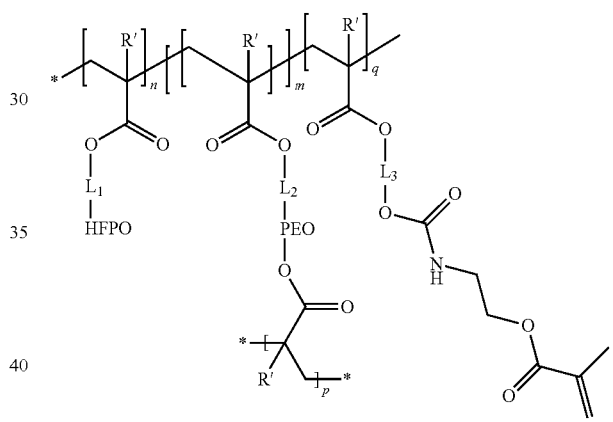

wherein PEO is a polyethylene oxide comprising at least four repeat units, $L_1$ and $L_2$ are independently linking groups, $L_3$ is —$C_2H_4$—, and R' is independently H or Me.

9. An optical display comprising:
an optical substrate having a surface layer that exhibits a cellulose surface attraction of no greater than 10%, the surface layer comprising the reaction product of
A) at least one perfluoropolyether polymer according to claim 1;
B) at least 50 wt-% of a non-fluorinated binder precursor.

10. The optical display of claim 9 wherein the surface layer exhibits a cellulose surface attraction of less than 5%.

* * * * *

UNITED STATES PATENT AND TRADEMARK OFFICE
CERTIFICATE OF CORRECTION

PATENT NO. : 8,628,855 B2
APPLICATION NO. : 12/740357
DATED : January 14, 2014
INVENTOR(S) : Encai Hao It is certified that error appears in the above-identified patent and that said Letters Patent is hereby corrected as shown below:

In the Specification

Column 4
Line 19, Delete "may by" and insert -- may be --, therefor.
Line 31, Delete "70 w." and insert -- 70 wt-%. --, therefor.
Line 38, Delete "40 w." and insert -- 40 wt-%. --, therefor.

Column 6
Line 6, Delete "—$CH_2CF_2O$" and insert -- —$CH_2$—$CF_2O$— --, therefor.
Line 6, Delete "—$[CF_2O]$—" and insert -- —$[CF_2O]_m$— --, therefor.

Column 8
Line 26, Delete "—NR'H," and insert -- —$NR^1H$, --, therefor.

Column 13
Line 29, Delete "estification" and insert -- esterification --, therefor.
Line 29, Delete "$CH_3$—O—" and insert -- $CH_3O$ --, therefor.
Line 30, Delete "$CH_3$—O—" and insert -- $CH_3O$ --, therefor.

Column 14
Line 52, Delete "and or" and insert -- and/or --, therefor.

Column 16
Line 16, Delete "dependant" and insert -- dependent --, therefor.

Column 18
Line 63, Delete "544A"" and insert -- S44A" --, therefor.

Signed and Sealed this
Sixteenth Day of September, 2014

Michelle K. Lee
*Deputy Director of the United States Patent and Trademark Office*

CERTIFICATE OF CORRECTION (continued)
U.S. Pat. No. 8,628,855 B2

Column 19
Line 7, Delete "CX-Z2101P"," and insert -- CX-Z210IP", --, therefor.

Column 25
Line 1-15,

Delete " 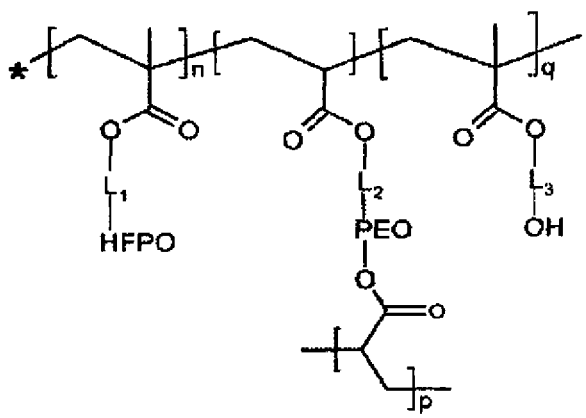 " and insert -- 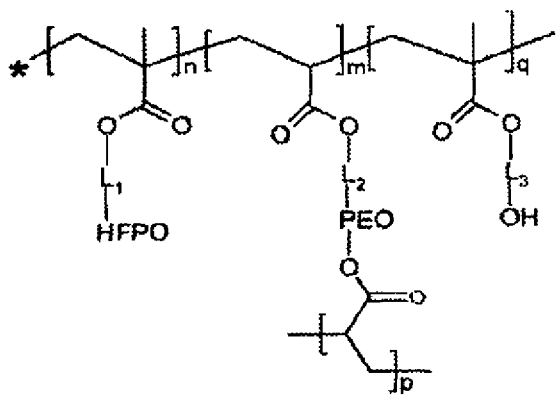 --, therefor.

Column 25
Line 53-67,

Delete " 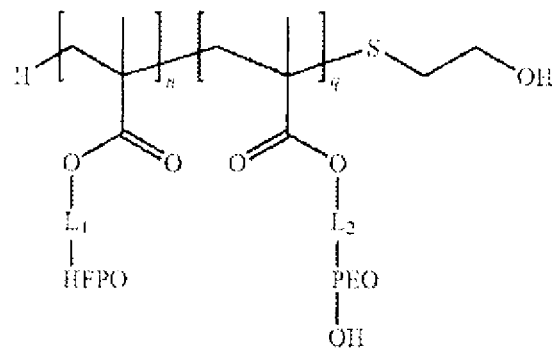 " and insert -- 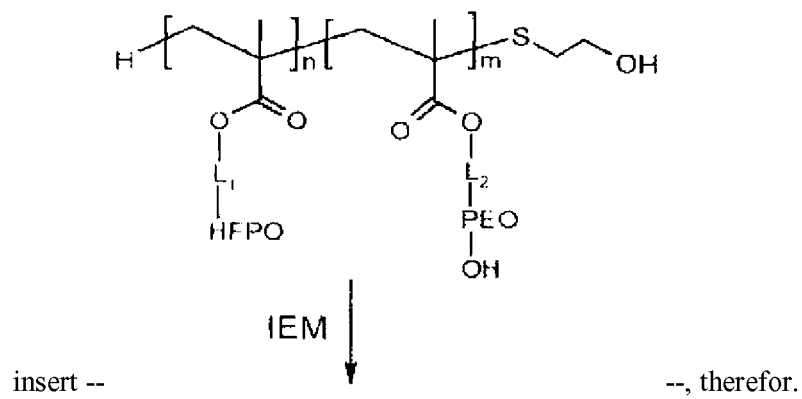 --, therefor.
Column 27-28
Line 14, Delete "measure" and insert -- measured --, therefor.
Column 29
Line 10, Delete "B2)" and insert -- B2). --, therefor.